United States Patent
Kim et al.

(10) Patent No.: US 11,941,249 B2
(45) Date of Patent: Mar. 26, 2024

(54) MEMORY DEVICE, HOST DEVICE AND MEMORY SYSTEM COMPRISING THE MEMORY DEVICE AND HOST DEVICE

(71) Applicant: Samsung Electronics Co., Ltd., Suwon-si (KR)

(72) Inventors: Dong-Woo Kim, Suwon-si (KR); Jae Sun No, Asan-si (KR); Byung June Song, Suwon-si (KR); Kyoung Back Lee, Hwaseong-si (KR); Wook Han Jeong, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/358,793

(22) Filed: Jun. 25, 2021

(65) Prior Publication Data

US 2022/0113877 A1 Apr. 14, 2022

(30) Foreign Application Priority Data

Oct. 14, 2020 (KR) .................. 10-2020-0132568

(51) Int. Cl.
*G06F 3/06* (2006.01)
(52) U.S. Cl.
CPC .......... *G06F 3/0611* (2013.01); *G06F 3/0659* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 7,679,133 B2 | 3/2010 | Son et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 10,430,117 B2 | 10/2019 | Jean | |
| 10,565,124 B2 | 2/2020 | Miura | |
| 10,579,538 B2 | 3/2020 | Marcu et al. | |
| 10,664,409 B2 | 5/2020 | Jung et al. | |
| 10,698,613 B1 * | 6/2020 | Wigmore | G06F 13/4022 |

(Continued)

OTHER PUBLICATIONS

European Office Action dated Jan. 5, 2022 issued in corresponding European Application No. 21185067.2.

(Continued)

*Primary Examiner* — Stephanie Wu
(74) *Attorney, Agent, or Firm* — Harness, Dickey & Pierce, P.L.C.

(57) ABSTRACT

A memory device, a host device and a memory system are provided. The memory device may include a plurality of storage units configured to store data, and at least one device controller configured to, receive a read command from at least one host device and to read data stored in the plurality of storage units in response to the read command, the at least one host device including at least one host memory including a plurality of HPB (high performance boosting) entry storage regions, and provide the at least one host device with a response command, the response command indicating an activation or deactivation of the plurality of HPB entry storage regions, the response command including HPB entry type information which indicates a HPB entry type of the HPB entry storage region.

18 Claims, 17 Drawing Sheets

(56) References Cited

U.S. PATENT DOCUMENTS

| | | | |
|---|---|---|---|
| 2011/0233648 A1 | 9/2011 | Seol et al. | |
| 2013/0297894 A1* | 11/2013 | Cohen | G06F 12/00 |
| | | | 711/154 |
| 2018/0136875 A1* | 5/2018 | Nimmagadda | G06F 3/0679 |
| 2018/0307425 A1 | 10/2018 | Blount | |
| 2018/0341429 A1* | 11/2018 | Bolkhovitin | G06F 3/067 |
| 2019/0138219 A1* | 5/2019 | Gschwind | G06F 12/1036 |
| 2019/0155746 A1 | 5/2019 | Bhatia et al. | |
| 2020/0133571 A1 | 4/2020 | Kim et al. | |
| 2020/0320008 A1* | 10/2020 | Byun | G06F 12/1045 |
| 2020/0334159 A1* | 10/2020 | Lee | G06F 3/0659 |
| 2021/0334200 A1* | 10/2021 | Xu | G06F 13/4221 |
| 2021/0357148 A1* | 11/2021 | Sela | G06F 9/30189 |
| 2022/0004489 A1* | 1/2022 | Cariello | G06F 3/0679 |
| 2022/0012174 A1* | 1/2022 | Seok | G06F 3/0634 |
| 2022/0171715 A1* | 6/2022 | Motoyama | G06F 12/1425 |

OTHER PUBLICATIONS

European Search Report dated Dec. 16, 2021 issued in corresponding European Application No. 21185067.2.

\* cited by examiner

| PPN | LBA | ADD INFO |
|-----|-----|----------|
| 1A  | 1A  | D1       |
| 1B  | 1B  | E1       |
| 2A  | 2A  | F1       |
| ⋮   | ⋮   | ⋮        |

FIG. 8

HPBETI

| RESPONSE UPIU ||||
|---|---|---|---|
| 0<br>xx10 0001b | 1<br>Flags | 2<br>LUN | 3<br>Task Tag |
| 4<br>IID \| Command Set Type | 5<br>HPB Entry Type \| Reserved | 6<br>Response | 7<br>Status = Good (00h) |
| 8<br>Total EHS Length (00h) | 9<br>Device Information bit 1: HPB_UPDATE_ALERT=1 | 10 (MSB)<br>Data Segment Length (14h) | 11 (LSB) |
| 12 (MSB) | 13 | 14 | 15 (LSB) |
| Residual Transfer Count ||||
| 16 | 17 | 18 | 19 |
| Reserved ||||
| 20 | 21 | 22 | 23 |
| Reserved ||||
| 24 | 25 | 26 | 27 |
| Reserved ||||
| 28 | 29 | 30 | 31 |
| Reserved ||||
| Header E2ECRC (omit if HD=0) ||||
| K (MSB) | K+1 (LSB) | K+2<br>Descriptor Type (80h) | K+3<br>Additional Length (10h) |
| Sense Data Length (12h) | | | |
| K+4<br>HPB Operation | K+5<br>LUN | K+6<br>Active HPB Count | K+7<br>Inactive HPB Count |
| K+8 (MSB) | K+9 (LSB) | K+10 (MSB) | K+11 (LSB) |
| Active HPB Region 0 || HPB Sub-Region of [K+8 : K+9] ||
| K+12 (MSB) | K+13 (LSB) | K+14 (MSB) | K+15 (LSB) |
| Active HPB Region 1 || HPB Sub-Region of [K+12 : K+13] ||
| K+16 (MSB) | K+17 (LSB) | K+18 (MSB) | K+19 (LSB) |
| Inactive HPB Region 0 || Inactive HPB Region 1 ||
| Data E2ECRC (omit if DD=0) ||||

FIG. 9

HPBETI

| 00 | Reserved |
|----|----------|
| 01 | HPB Entry Type 1 |
| 10 | HPB Entry Type 2 |
| 11 | HPB Entry Type 1 & 2 |

FIG. 10

HPBETI

| Bit<br>Byte | 7 | 6 | 5 | 4 | 3 | 2 | 1 | 0 |
|---|---|---|---|---|---|---|---|---|
| 0 | OPERATION CODE (F9h) ||||||||
| 1 | HPB Entry Type || BUFFER ID ||||||
| 2 | (MSB) |||||||  |
| 3 | HPB REGION |||||||(LSB) |
| 4 | (MSB) |||||||  |
| 5 | HPB SUBREGION |||||||(LSB) |
| 6 | (MSB) |||||||  |
| 7 | ALLOCATION LENGTH |||||||  |
| 8 | |||||||(LSB) |
| 9 | CONTROL = 00h ||||||||

| Bit<br>Byte | 7 | 6 | 5 | 4 | 3 | 2 | 1 | 0 |
|---|---|---|---|---|---|---|---|---|
| 0 | OPERATION CODE (FAh) ||||||||
| 1 | HPB Entry Type (HPBETI) || BUFFER ID ||||||
| 2 | (MSB) HPB REGION |||||||  |
| 3 |  |||||||(LSB) |
| 4 | Reserved ||||||||
| ... | ||||||||
| 8 | ||||||||
| 9 | CONTROL = 00h ||||||||

| Bit<br>Byte | 7 | 6 | 5 | 4 | 3 | 2 | 1 | 0 |
|---|---|---|---|---|---|---|---|---|
| 0 | OPERATION CODE (F8h) | | | | | | | |
| 1 | HPB Entry Type | | Reserved | | | | | |
| 2 | (MSB) | | | | | | | |
| ... | LOGICAL BLOCK ADDRESS | | | | | | | |
| 5 | | | | | | | | (LSB) |
| 6 | (MSB) | | | | | | | |
| ... | HPB ENTRY | | | | | | | |
| 13 | | | | | | | | (LSB) |
| 14 | TRANSFER LENGTH | | | | | | | |
| 15 | CONTROL = 00h | | | | | | | |

HPBETI

MEMORY DEVICE, HOST DEVICE AND MEMORY SYSTEM COMPRISING THE MEMORY DEVICE AND HOST DEVICE

This application claims the benefit of priority under 35 USC § 119(a) to Korean Patent Application No. 10-2020-0132568, filed on Oct. 14, 2020 in the Korean Intellectual Property Office, the disclosure of which is incorporated herein by reference in its entirety.

BACKGROUND

Various example embodiments of the inventive concepts relate to memory devices, host devices, memory systems including the memory device and the host device, and/or methods of operating the memory devices and/or host devices.

In order to reduce the read latency of a memory device, a HPB (High Performance Boosting) technology is used in which a host device provides a memory device with mapping information between a physical address and a logical address, together with a read command.

Additionally, as a storage capacity of the memory device increases and its configuration becomes complicated, the read operation of the memory device requires additional types of information related to the read operation, in addition to such mapping information. Therefore, there is a need for research on a method for effectively transferring the additional information from the host device to the memory device.

SUMMARY

Aspects of at least one example embodiment of the inventive concepts provide a memory device, a host device, and a memory system in which read latency is reduced and operating reliability is improved.

Aspects of at least one example embodiment of the inventive concepts also provide a method for driving a memory system in which read latency is reduced and operating reliability is improved.

According to some example embodiments of the inventive concepts, there is provided a memory device comprising a plurality of storage units configured to store data, and at least one device controller configured to, receive a read command from at least one host device and to read data stored in the plurality of storage units in response to the read command, the at least one host device including at least one host memory including a plurality of HPB (high performance boosting) entry storage regions, and provide the at least one host device with a response command, the response command indicating an activation or deactivation of the plurality of HPB entry storage regions, the response command including HPB entry type information which indicates a HPB entry type of the HPB entry storage region.

According to some example embodiments of the inventive concepts, there is provided a host device comprising at least one host memory including a plurality of HPB (high performance boosting) entry storage regions, and at least one host controller configured to transmit a HPB entry and a read command to at least one memory device, the HPB entry to be stored in one of the plurality of HPB entry storage regions, and the read command including HPB entry type information indicating a HPB entry type of the transmitted HPB entry.

According to some example embodiments of the inventive concepts, there is provided a memory system comprising at least one host memory configured to store at least one HPB (high performance boosting) entry, at least one host controller configured to output a read command including the at least one HPB entry, a plurality of storage units configured to store user data, and at least one device controller configured to receive the read command from the at least one host controller, and read data stored in the plurality of storage units in response to the read command, the read command including HPB entry type information, the HPB entry type information indicating a type of the HPB entry.

According to some example embodiments of the inventive concepts, there is provided a method for operating a memory system comprising receiving, by a memory device, a memory operation command from a host device, the host device including a plurality of HPB (high performance boosting) entry storage regions, and providing, by the memory device, the host device with a response command indicating activation or deactivation of at least one HPB entry storage region of the plurality of HPB entry storage regions in response to the memory operation command, the response command including HPB entry type information which indicates a type of HPB entry associated with the at least one HPB entry storage region to be activated or deactivated.

According to some example embodiments of the inventive concepts, there is provided a method for operating a memory system comprising receiving, by a host device, a response command indicating activation of at least one HPB (high performance boosting) entry storage region of a plurality of HPB entry storage regions included in a host memory, and providing, by the host device, a request command to a device controller in response to the response command, the request command requesting an HPB entry to be stored in the at least one HPB entry storage region to be activated, the request command including HPB entry type information indicating a type of HPB entry to be stored in the at least one HPB entry storage region to be activated.

However, aspects of the example embodiments of the inventive concepts are not restricted to the ones set forth herein. These and other aspects of the example embodiments inventive concepts will become more apparent to one of ordinary skill in the art to which the inventive concepts pertain by referencing the detailed explanation of the example embodiments of the inventive concepts given below.

BRIEF DESCRIPTION OF THE DRAWINGS

These and other aspects and features of the example embodiments of the inventive concepts will become more apparent by describing in detail example embodiments thereof referring to the attached drawings, in which:

FIG. 5 is a diagram for explaining the HPB entry stored in the memory device according to some example embodiments;

FIGS. 7 to 10 are diagrams for explaining the operation of the memory system shown in FIG. 6 according to some example embodiments;

DETAILED DESCRIPTION

Hereinafter, various example embodiments according to the technical ideas of the inventive concepts will be described referring to the accompanying drawings.

Figure 1:
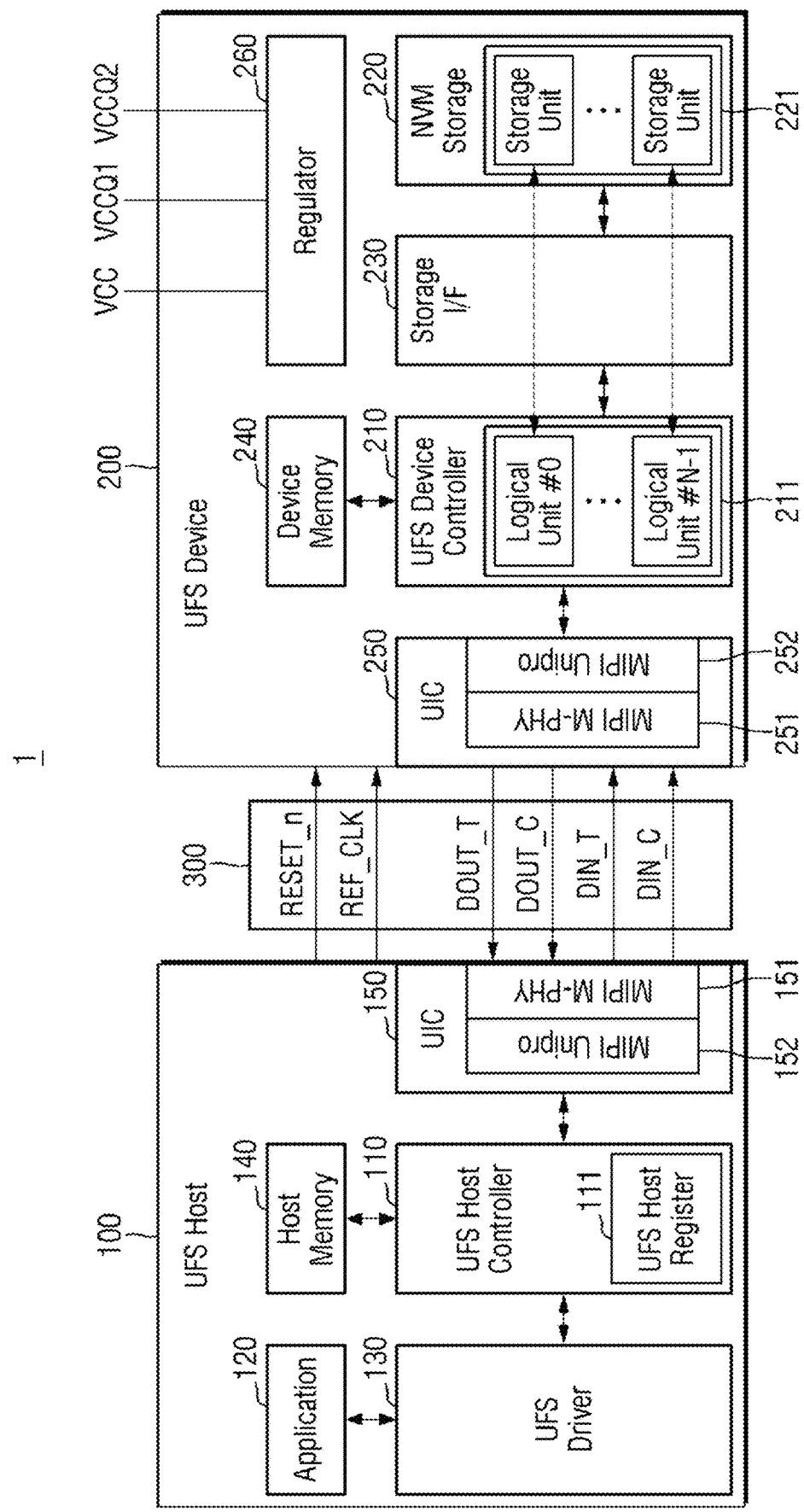
FIG. 1 is a diagram showing a memory system according to some example embodiments.
Figure 2:
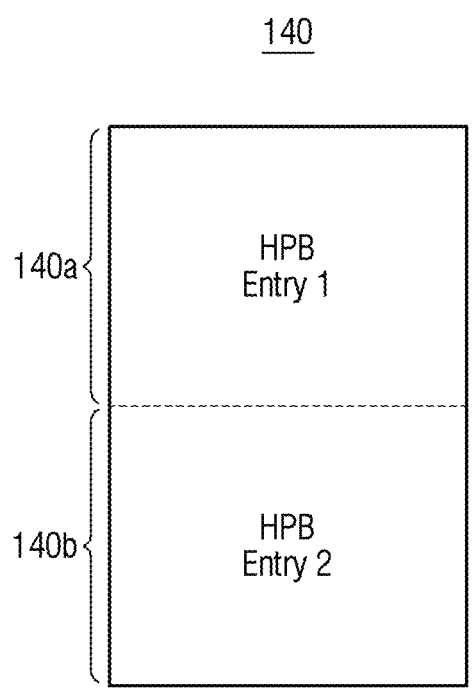
FIG. 2 is a diagram for explaining a host memory of FIG. 1 according to some example embodiments.
Figure 3:
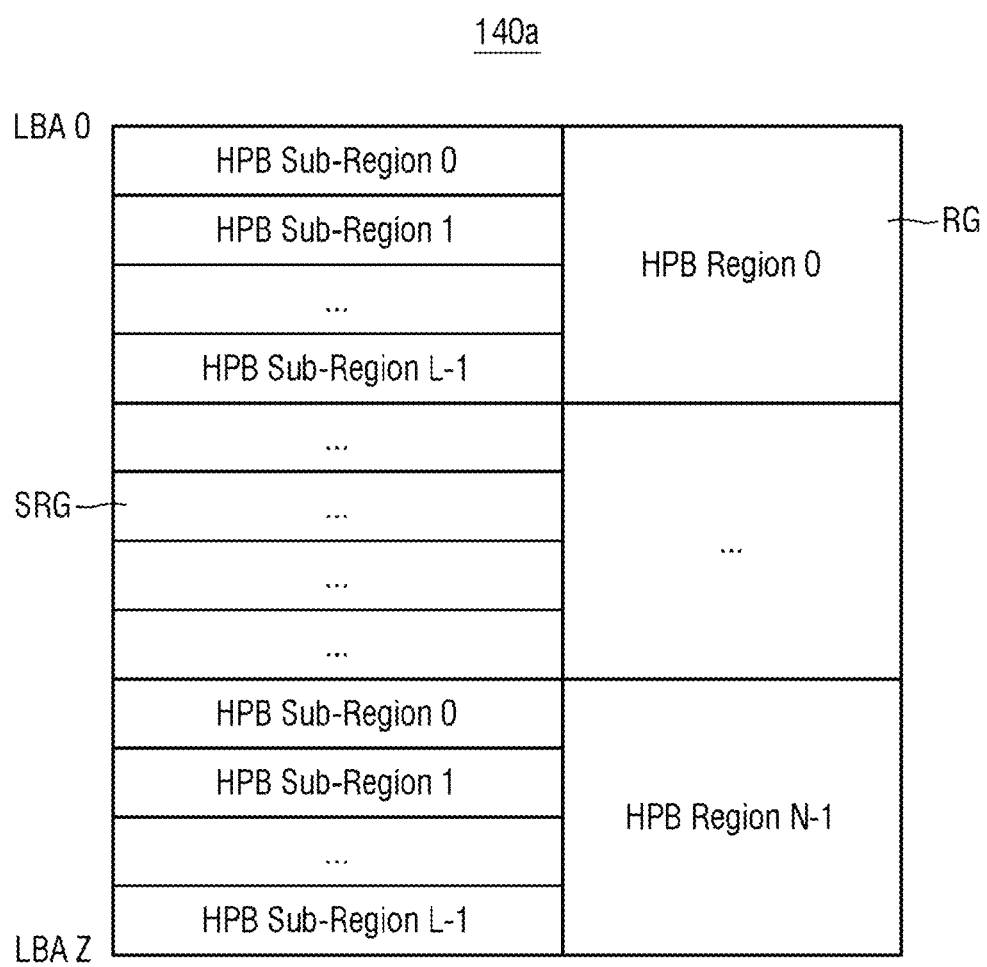
FIG. 3 is a diagram for explaining a first region of the host memory of FIG. 2 according to some example embodiments.
Figure 4:
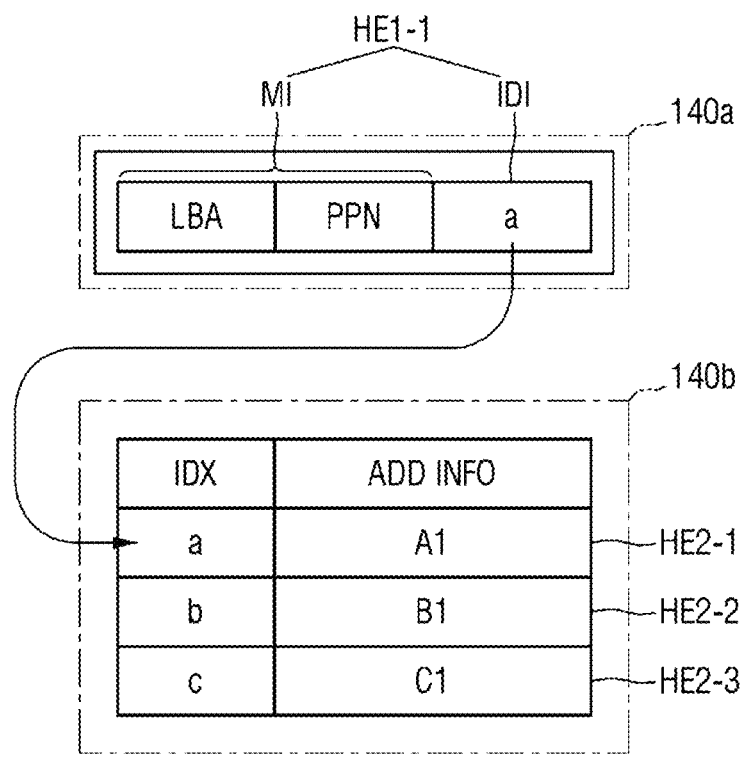
FIG. 4 is a diagram for explaining an HPB entry stored in the host memory according to some example embodiments.
Figure 5:
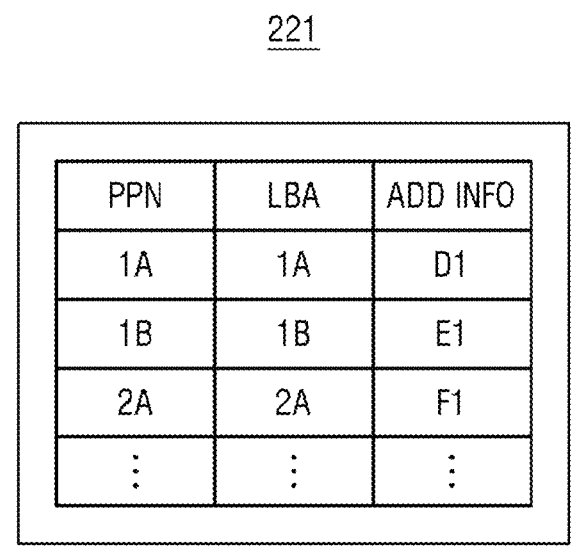

FIG. 1 is a diagram showing a memory system according to some example embodiments. FIG. 2 is a diagram for explaining the host memory of FIG. 1 according to some example embodiments. FIG. 3 is a diagram for explaining a first region of the host memory of FIG. 2 according to some example embodiments. FIG. 4 is a diagram for explaining a HPB entry stored in the host memory. FIG. 5 is a diagram for explaining the HPB entry stored in a memory device according to some example embodiments.

Although a memory system according to the technical ideas of the inventive concepts will be described below by taking an example of a system conforming to a UFS (Universal Flash Storage) standard announced at JEDEC (Joint Electron Device Engineering Council), the technical ideas of the inventive concepts are not limited thereto. Specifically, although the technical ideas of the inventive concepts will be described below by using an example of a memory system operating on the basis of HPB (High Performance Boosting) standard in the UFS standard, the example embodiments are not limited thereto, and one or more of the example embodiments of the memory system to be implemented within the scope of inventive concepts may be implemented with various and/or different modifications.

Referring to FIG. 1, a UFS system 1 may include a host device 100, a memory device 200 and/or a UFS interface 300, etc., but the example embodiments are not limited thereto, and for example, may include a greater or lesser number of constituent elements.

The host device 100 and the memory device 200 may be connected to each other through a UFS interface 300, but are not limited thereto. In some example embodiments, the host device 100 may be implemented as part of an application processor, but is not limited thereto.

The host device 100 may include a UFS host controller 110, an application 120, a UFS driver 130, a host memory 140 and/or a UIC (UFS interconnect) layer 150, etc.

The memory device 200 may include a UFS device controller 210, a non-volatile storage 220 (e.g., a non-volatile storage device, a non-volatile memory device, etc.), a storage interface 230, a device memory 240, a UIC layer 250 (e.g., UIC layer circuitry, etc.), and/or a regulator 260 (e.g., regulator circuitry, etc.), etc.

The non-volatile storage 220 may be made up of a plurality of storage units 221 (e.g., memory chips, memory units, etc.), and although such storage units 221 may include a V-NAND (vertical-NAND) flash memory of a two-dimensional (2D) and/or three-dimensional (3D) structure, it may also include other types of non-volatile memory such as, a PRAM (phase change random access memory (RAM)) and/or a RRAM (resistive RAM), etc., but the example embodiments are not limited thereto.

The UFS device controller 210 and the non-volatile storage 220 may be connected to each other through the storage interface 230. The storage interface 230 may be implemented to conform to standard regulations such as Toggle or ONFI (Open NAND Flash Interface), but the example embodiments are not limited thereto. The operation between the UFS device controller 210 and the non-volatile storage 220 using the toggle will be explained below.

The application 120 may refer to at least one program that wants to communicate with the memory device 200 to utilize the functions of the memory device 200. The application 120 may transmit an input-output request (IOR) to the UFS driver 130 for the input and output to and from the memory device 200. The input-output request (IOR) may refer to, but is not limited to, a read request, a write request and/or an erase request of data, and the like.

The UFS driver 130 may manage the UFS host controller 110 through a UFS-HCI (host controller interface). The UFS driver 130 may translate the input-output request generated by the application 120 into UFS commands defined by the UFS standard, and may transfer the translated UFS command to the UFS host controller 110. One input-output request may be translated into a plurality of UFS commands, but is not limited thereto. The UFS commands may basically be commands defined by the SCSI (Small Computer System Interface) standard, etc., but may also be UFS standard-only commands, but are not limited thereto.

The UFS host controller 110 may transmit the UFS commands translated by the UFS driver 130 to the UIC layer 250 of the memory device 200 through the UIC layer 150 and the UFS interface 300. In this process, the UFS host register 111 of the UFS host controller 110 may act as a command queue (CQ), etc.

The UIC layer 150 on the host device 100 side may include at least one physical layer interface, such as MIPI M-PHY 151 (e.g., MIPI M-PHY circuitry, etc.) and/or at least one transport layer interface, such as MIPI UniPro 152 (e.g., MIPI UniPro circuitry, etc.), and the UIC layer 250 on the memory device 200 side may also include at least one physical layer interface, such as MIPI M-PHY 251, etc., and/or at least one transport layer interface, such as MIPI UniPro 252, etc., but the example embodiments are not limited thereto.

The UFS interface 300 may include a line that transmits a reference clock REF_CLK, a line that transmits a hardware reset signal RESET_n of the memory device 200, a pair of lines that transmits differential input signal pairs DIN_T and DIN_C, and/or a pair of lines that transmits differential output signal pairs DOUT_T and DOUT_C, etc., but the example embodiments are not limited thereto.

A frequency value of the reference clock provided from the host device 100 to the memory device 200 may be, but is not necessarily limited to, one of four values of 19.2 MHz, 26 MHz, 38.4 MHz and/or 52 MHz, etc. The host device 100 may change the frequency value of the reference clock even during operation, that is, even while data transmission and/or reception are being performed between the host device 100 and the memory device 200.

The memory device 200 may generate clocks of various frequencies from the reference clock provided from the host device 100, using a phase-locked loop (PLL) or the like. Further, the host device 100 may also set a value of a data rate between the host device 100 and the memory device 200 through the frequency value of the reference clock. That is, the value of the data rate may be determined based on the frequency value of the reference clock, but the example embodiments are not limited thereto.

The UFS interface 300 may support multiple lanes, and each lane may be implemented using a differential pair, but are not limited thereto. For example, the UFS interface 300 may include one or more receive lanes and/or one or more transmit lanes. In FIG. 1, a pair of lines that transmit the differential input signal pairs DIN_T and DIN_C may constitute a receive lane, and a pair of lines that transmits the differential output signal pairs DOUT_T and DOUT_C may constitute a transmit lane, respectively, but the example embodiments are not limited thereto. Although one transmit lane and one receive lane are shown in FIG. 1, the number of transmit lanes and receive lanes may be modified and implemented.

The receive lane and the transmit lane may transmit data in a serial communication manner, and a full-duplex type of communication data between the host device 100 and the memory device 200 is allowed by the structure in which the receive lane and the transmit lane are separated, but the example embodiments are not limited thereto. That is, the memory device 200 may transmit data to the host device 100 through the transmit lane even while receiving data from the host device 100 through the receive lane, etc. Also, control data such as at least one command from the host device 100 to the memory device 200, and user data from the host device 100 to be stored in the non-volatile storage 220 of the memory device 200 or to be read from the non-volatile storage 220 may be transmitted through the same lane. Accordingly, a separate lane for data transmission is not required to be further provided between the host device 100 and the memory device 200, in addition to a pair of transmit lanes and a pair of receive lanes.

The UFS device controller 210 of the memory device 200 may be processing circuitry used to generally control the operation of the memory device 200. According to some example embodiments, the processing circuitry may include hardware, such as processors, processor cores, logic circuits, storage devices, etc.; a hardware/software combination such as at least one processor core executing software and/or executing any instruction set, etc.; or a combination thereof. For example, the processing circuitry more specifically may include, but is not limited to, a field programmable gate array (FPGA), a programmable logic unit, an application-specific integrated circuit (ASIC), s System-on-Chip (SoC), etc.

For example, the UFS device controller 210 may manage the non-volatile storage 220 through the LU (logical unit) 211, which is a logical data storage unit. The number of LUs 211 may be, for example, but is not limited to, eight.

The UFS device controller 210 may include a flash translation layer (FTL), and may translate a logical data address transferred from the host device 100 using the address mapping information of FTL, for example, translate an LBA (logical block address), into a physical data address, for example, a PBA (physical block address) or a PPN (physical page number), etc. In the UFS system 1, the logical block for storing user data may have a size of a predetermined or alternatively, desired range. For example, a desired and/or minimum size of a logical block may be set to 4 Kbyte, but the example embodiments are not limited thereto, and the desired and/or minimum size of the logical block may be configurable, etc.

When a command from the host device 100 is input to the memory device 200 through the UIC layer 250, the UFS device controller 210 executes an operation based on and/or according to the input command, and may transmit a completion response to the host device 100 when the operation is completed, but is not limited thereto.

For example, if the host device 100 tries to store user data in the memory device 200, the host device 100 may transmit a data write command to the memory device 200. When a response of ready-to-transfer is received from the memory device 200, the host device 100 may transmit the user data to the memory device 200. The UFS device controller 210 may temporarily store the transmitted user data at a temporary location in the device memory 240, and then may store the user data temporarily stored in the device memory 240 at a selected and/or desired location on the non-volatile storage 220 on the basis of the address mapping information of FTL.

As another example, if the host device 100 tries to read the user data stored in the memory device 200, the host device 100 may transmit the data read command to the memory device 200. The UFS device controller 210 which has received the data read command from the host device 100 reads the user data from the non-volatile storage 220 in response to the data read command, and may temporarily store (e.g., cache, etc.) the read user data in the device memory 240. In this read process, the UFS device controller 210 may detect and correct errors of the read user data using a built-in ECC (error correction code) circuit (not shown), but the example embodiments are not limited thereto, and for example, the error correction may not be performed by the UFS device controller 210 and/or the error correction may be performed by another entity or omitted, etc. Further, the UFS device controller 210 may transmit the user data temporarily stored in the device memory 240 of the device to the host device 100.

In some example embodiments, the UFS system 1 may support a HPB read operation. In some example embodiments, when the host device 100 tries to read the user data stored in the memory device 200, the host device 100 may transmit the physical address corresponding to the user data to be read with an HPB read command including additional information desired and/or required for read operation to the memory device 200, but the example embodiments are not limited thereto. A more specific description thereof will be provided below.

Moreover, the UFS device controller 210 may further include data encryption circuitry, such as an AES (advanced encryption standard) circuit (not shown), and the AES circuit may encrypt or decrypt data to be input to the UFS device controller 210, using a symmetric-key algorithm, but the example embodiments are not limited thereto, and for example, other types of encryption circuitry may be used, the encryption process may be omitted, etc.

The host device 100 sequentially stores the commands to be transmitted to the memory device 200 in a UFS host register 111 capable of functioning as a command queue, and may sequentially transmit the commands to the memory device 200, but is not limited thereto. At this time, even when the previously transmitted command is still being processed by the memory device 200, that is, even before receiving the notification, indication, and/or acknowledgement that the previously transmitted command has completely processed (e.g., completed the processing of a previous memory operation, etc.) by the memory device 200, the host device 100 may transmit the next command waiting in the command queue to the memory device 200, and thus, the memory device 200 may also receive the next command from the host device 100 even while performing the processing of the previously transmitted command. A maximum number (queue depth) of commands that may be stored in the command queue may be, for example, 32, but the example embodiments are not limited thereto. Also, the command queue may be implemented as a circular queue type that indicates the start and end of the command sequence stored in the queue through a head pointer and a tail pointer, respectively, but is not limited thereto, and for example, may be implemented as other queue types, such as priority queues, double-ended queues, etc., and/or other types of data structures, such as stacks, trees, etc.

Each of the plurality of storage units 221 may include a memory cell array (not shown) and/or a control circuit (not shown) that controls the operation of the memory cell array, but the example embodiments are not limited thereto. The memory cell array may include a two-dimensional memory cell array and/or a three-dimensional memory cell array. The memory cell array includes multiple memory cells, and each memory cell may be a cell (single level cell, SLC) that stores 1-bit information, but may also be a cell which stores information of 2 bits or more, such as a MLC (multi level cell), a TLC (triple level cell), and a QLC (quadruple level cell), etc. A three-dimensional memory cell array may include a vertical NAND string vertically oriented so that at least one memory cell is located above another memory cell. A more specific description thereof will be provided later.

A power supply voltage VCC, e.g., a VCCQ1, a VCCQ2, and the like, may be input to the memory device 200. The VCC is a main power supply voltage for the memory unit 200, and may have, for example, a value of 2.4 to 3.6V, but is not limited thereto. The VCCQ1 is a power supply voltage for supplying a low range of voltage, and may supply the UFS device controller 210, etc., and may have, for example, a value between 1.14 and 1.26V, etc. The VCCQ2 is a power supply voltage for supplying a voltage in a range lower than VCC but higher than VCCQ1, and may be used for input-output interfaces, such as a MIPI M-PHY 251, etc., and may have, for example, a value of 1.7 to 1.95V, etc., but the example embodiments are not limited thereto. The aforementioned power supply voltages may be supplied for each component of the memory device 200 via the regulator 260, but are not limited thereto. The regulator 260 may be implemented, for example, as a set of unit regulators, each connected to different power supply voltages, but is not limited thereto.

Referring to FIG. 2, the host memory 140 may store the HPB entry for supporting the HPB read operation described above. A first region 140a of the host memory 140 may be a region in which a first type HPB entry (e.g., HPB entry 1) is stored, and a second region 140b may be a region in which a second type HPB entry (e.g., HPB entry 2) is stored, etc., but the example embodiments are not limited thereto. In other words, the host memory 140 may include at least one memory region, and each of the memory regions may store a corresponding HPB entry, etc.

Referring to FIG. 3, a first region 140a of the host memory 140 may include, for example, a plurality of HPB entry storage regions RG corresponding to the LUs 211 described above, but is not limited thereto. Further, each HPB entry storage region RG may include a plurality of HPB entry sub-storage regions SRG. Each HPB entry storage region RG or HPB entry sub-storage region SRG may be activated or deactivated as desired and/or needed. The first type HPB entry (e.g., HPB entry 1) stored in the activated HPB entry storage region RG or HPB entry sub-storage region SRG may be used for a HPB read operation, but is not limited thereto.

Referring to FIG. 4, a first type HPB entry (e.g., HE1-1) stored in the first region 140a of the host memory 140 may include mapping information MI and/or indexing information IDI, etc., but the example embodiments are not limited thereto. Even though the drawing shows only one first type HPB entry (e.g., HE1-1) stored in the HPB entry sub-storage region SRG, the HPB entry sub-storage region SRG may store a plurality of first type HPB entries.

According to at least one example embodiment, the mapping information MI is information that defines a mapping relationship between a logical address LBA (e.g., a logical memory address assigned by an operating system or the like corresponding to the memory operation) and a physical address PPN (e.g., a physical memory address corresponding to a physical memory location on the memory device 200), etc. Specifically, the mapping information MI may be stored in the form in which the physical address PPN in the memory device 200 of the user data addressed to the logical address LBA matches the logical address LBA, etc., or in other words, the mapping information MI allows for translation of the logical address LBA into a physical address PPN, or vice versa.

The indexing information IDI is information indicating a second type HPB entry (e.g., HE2-1) stored in the second region 140b of the host memory 140. In some example embodiments, the indexing information IDI may be location information (e.g., memory address information, etc.) used to find the second type HPB entry (HE2-1) stored in the second region 140b of the host memory 140, but the example embodiments are not limited thereto.

In response to the UFS host controller 110 transmitting an HPB read command to the memory device 200, the UFS host controller 110 finds the second type HPB entry (HE2-1) associated with the first type HPB entry (HE1-1) among the multiple second type HPB entries HE2-1, HE2-2 and HE2-3, etc., by referring to the indexing information IDI of the first type HPB entry (HE1-1). Additionally, the HPB read command transmitted by the UFS host controller 110 may include the first type HPB entry (HE1-1), e.g., the mapping information MI, and the second type HPB entry (HE2-1), e.g., the indexing information IDI, etc., and provided to the memory device 200, etc.

The second type HPB entry (HE2-1) may further include additional information ADD INFO, but is not limited thereto. The additional information ADD INFO may be information associated with the memory operation performed by the UFS device controller 210 of the memory device 200 in response to the command received from the host device 100. Specifically, the additional information ADD INFO may be information which improves and/or enhances the reliability of the operation to be performed by the UFS device controller 210 of the memory device 200 in response to the command from the host device 100.

In some example embodiments, the additional information ADD INFO may include information related to the voltage level of the read voltage used when the UFS device controller 210 reads data stored in the plurality of storage units 221 in response to the read command from the host device 100. Also, in some example embodiments, the additional information ADD INFO may include memory cell count information that may be referred to when the UFS device controller 210 reads data stored in the plurality of storage units 221 in response to the read command from the host device 100, etc., but the example embodiments are not limited thereto.

The size of the first type HPB entry (HE1-1) may be, for example, 8 bits, but is not limited thereto. As the storage capacity of the memory device 200 increases and its configuration becomes complicated, an amount of additional information ADD INFO desired and/or required for the memory operations of the memory device 200 may also gradually increase. However, the additional information ADD INFO may not be entirely included in the first type HPB entry (HE1-1) of the limited size, etc.

Therefore, in some example embodiments, the second type HPB entry (HE2-1) may be stored in the second region 140b of the host memory 140, and the size of the second type HPB entry (HE2-1) may not be limited and/or have a higher size limit than the size of the first type HPB entry, thereby allowing the ADD INFO to be fully stored in the second type HPB entry, etc. Additionally, indexing information IDI indicating the associated second type HPB entry (HE2-1) may be stored and/or included in the first type HPB entry (HE1-1), thereby solving the problem of large additional information ADD INFO sizes caused by an increase in the storage capacity of the memory device 200, etc. When the memory device 200 performs the read operation using the additional information ADD INFO of the second type HPB entry (HE2-1) that is not limited in size in this way and/or has a greater size limit than the first type HPB entry, the read latency of the memory device 200 is reduced and operating reliability can be improved.

Referring to FIGS. 1 and 5, at least one of the plurality of storage units 221 included in the non-volatile storage 220 of the memory device 200 may store a physical address PPN, a logical address LBA corresponding to the physical address PPN, and/or the additional information ADD INFO corresponding to the physical address PPN, etc., but the example embodiments are not limited thereto. In some example embodiments, the UFS device controller 210 of the memory device 200 may generate the first type HPB entry (HPB entry 1) and the second type HPB entry (HPB entry 2) stored in the host memory 140 from the physical address PPN, a logical address LBA corresponding to the physical address PPN, and/or the additional information ADD INFO corresponding to the physical address PPN, etc., but the example embodiments are not limited thereto. A specific description thereof will be provided later.

In some example embodiments, at least one first type HPB entry (HPB entry 1) and at least one second type HPB entry (HPB entry 2) generated by the UFS device controller 210 may be stored in the device memory 240. For example, according to some example embodiments, the physical address PPN, the logical address LBA and the additional information ADD INFO stored in at least one of the plurality of storage units 221 are cached to the device memory 240, and may be stored in the form of the first type HPB entry (HPB entry 1) and second type HPB entry (HPB entry 2), but the example embodiments are not limited thereto.

When the first type HPB entry (HPB entry 1) and the second type HPB entry (HPB entry 2) are stored in the device memory 240, the device memory 240 may store the first type HPB entry (HPB entry 1) and the second type HPB entry (HPB entry 2) using a structure similar to the host memory 140 described above. For example, the device memory 240 may include multiple HPB entry storage regions (RG of FIG. 3) and multiple HPB entry sub-storage regions (SRG of FIG. 3), etc. However, example embodiments are not limited thereto, and the storage form of the device memory 240 may be modified in other different ways.

In some example embodiments, after the memory device 200 generates the first type HPB entry (HPB entry 1) and the second type HPB entry (HPB entry 2), they are provided to the host device 100. Hereinafter, the operation in which the first type HPB entry (HPB entry 1) and the second type HPB entry (HPB entry 2) of the memory device 200 are provided to the host device 100 will be described referring to FIGS. 1 and 6 to 10.

Figure 6:
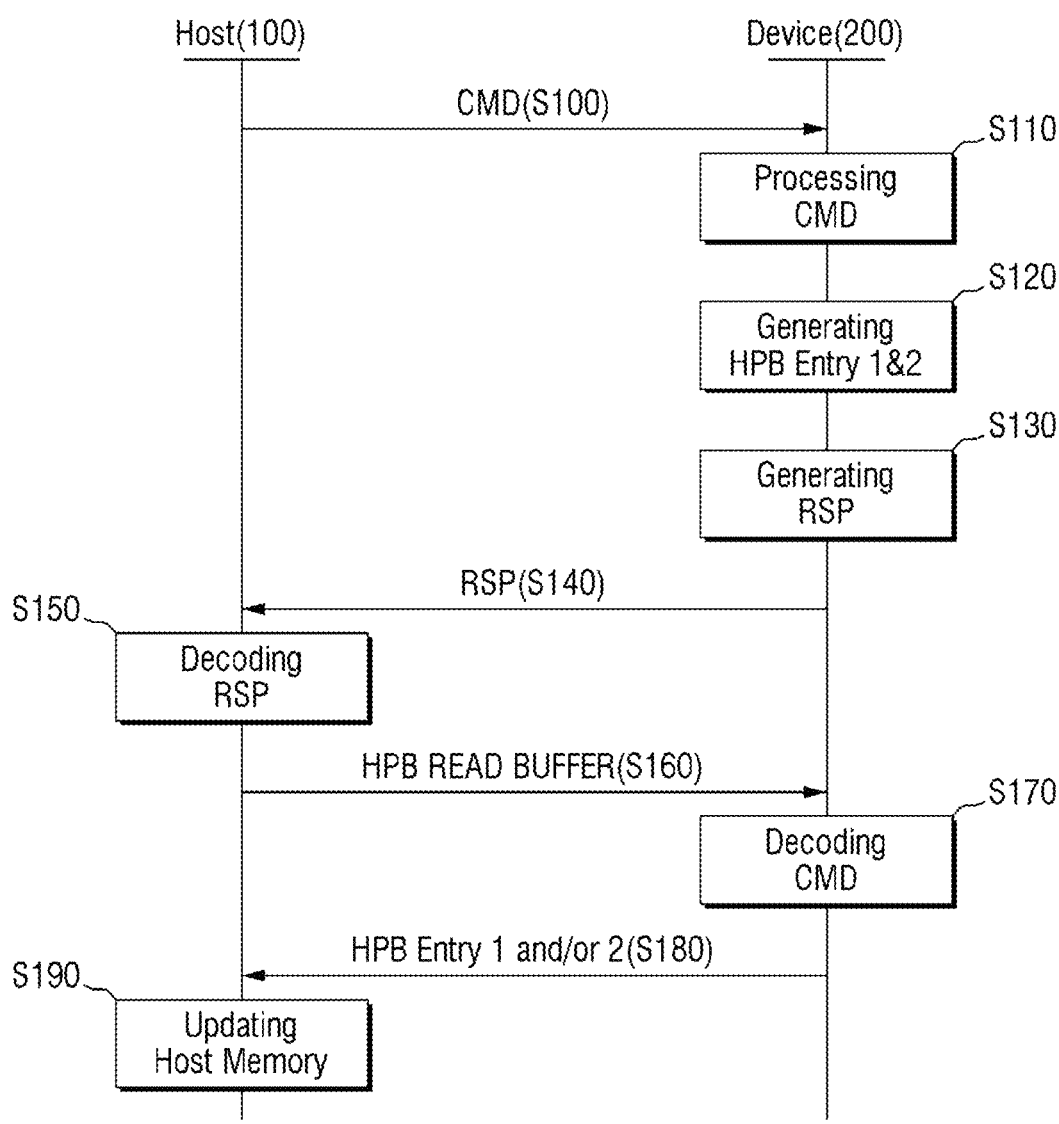
FIG. 6 is a flowchart showing the operation of the memory system according to some example embodiments.

FIG. 6 is a flowchart showing the operation of the memory system according to some example embodiments. FIGS. 7 to 10 are diagrams for explaining the operation of the memory system shown in FIG. 6 according to some example embodiments.

Although the operations shown in FIG. 6 may be performed in a state in which the UFS system 1 set to, for example, a device control mode, example embodiments are not limited thereto, and the UFS system 1 may be set to other modes.

Referring to FIGS. 1 and 6, the host device 100 provides the command to the memory device 200 (S100). Here, the command may include a read command, a write command, an erase command, and the like.

The memory device 200 to which the command is provided processes the command in response to the command (S110). For example, if the command provided from the host device 100 is a write command, the UFS device controller 210 of the memory device 200 writes the user data provided together with the write command in the non-volatile storage 220, for example, using a toggle technique, but the example embodiments are not limited thereto. A more specific explanation thereof will be provided later.

The physical address of the non-volatile storage 220 corresponding to the logical address that addresses the user data may be changed according to the memory operation, e.g., the write operation, etc. For example, when such a change occurs (e.g., when a write operation occurs, when the memory operation is performed, etc.), the memory device 200 generates a first type HPB entry (HPB entry 1) and a second type HPB entry (HPB entry 2) (S120), etc.

Figure 7:
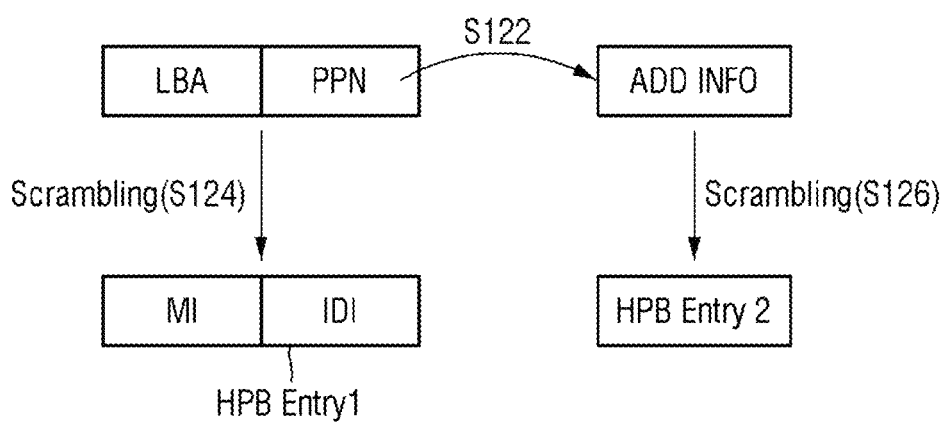

Specifically, referring to FIG. 7, the UFS device controller 210 first finds the corresponding additional information ADD INFO based on, associated with, and/or corresponding to the physical address PPN to which the corresponding logical address LBA is to be changed (S122). The UFS device controller 210 scrambles (and/or encrypts, hashes, translates, etc.) the physical address PPN and the logical address LBA that need to be changed, generates mapping information MI between the physical address PPN and the logical address LBA, and generates indexing information IDI that indicates and/or points to the additional information ADD INFO (S124), etc. The first type HPB entry (HPB entry 1) including the mapping information MI and the indexing information IDI is generated accordingly.

Further, the UFS device controller 210 scrambles (and/or encrypts, hashes, translates, etc.) the additional information ADD INFO to generate the second type HPB entry (HPB entry 2) (S126), but the example embodiments are not limited thereto.

In some example embodiments, when there is no need for generation of the second type HPB entry (HPB entry 2), the UFS device controller 210 may omit the generation of the second type HPB entry (HPB entry 2).

Although FIG. 6 shows the procedure for generating the first type HPB entry (HPB entry 1) and the second type HPB entry (HPB entry 2) immediately after the memory device 200 processes the command, this is only an example, and example embodiments are not limited thereto. The generation operation of the first type HPB entry (HPB entry 1) and the second type HPB entry (HPB entry 2) may be performed at a different and/or arbitrary time before the step (S180) in which the memory device 200 provides the host device 100 with the first type HPB entry (HPB entry 1) and/or the second type HPB entry (HPB entry 2), or in other words, the generation operation may not occur immediately after the memory device 200 processes the memory command, etc.

Next, the memory device 200 generates a response command (S130).

Here, the response command RSP may be a command that recommends and/or instructs (e.g., causes) the activation or deactivation of a plurality of HPB entry storage regions of the host memory 140, but is not limited thereto. For example, when the physical address of the non-volatile storage 220 corresponding to the logical address that addresses the user data changes, the UFS device controller 210 may provide the UFS host controller 110 with the response command RSP that recommends and/or instructs deactivation of the HPB entry storage region (e.g., RG of FIG. 3) of the corresponding host memory 140.

In some example embodiments, the response command RSP may be implemented in the form of RESPONSE UPIU packet shown in FIG. 8 conforming to JEDEC HPB standard, but is not limited thereto. Since the detailed configuration of RESPONSE UPIU packet conforming to the JEDEC HPB standard is described in the JEDEC HPB standard documents, detailed explanation thereof will not be provided.

In some example embodiments, the response command RSP generated by the UFS device controller 210 includes HPB entry type information HPBETI as shown in FIG. 8.

The HPB entry type information HPBETI may be made up of, for example, 2 bits, but is not limited thereto. Referring to FIG. 9, for example, when the value of HPB entry type information HPBETI is "01," it is an indication for the first type HPB entry (e.g., HPB entry 1). For example, when the value of HPB entry type information HPBETI is "10," it is an indication of the second type HPB entry (e.g., HPB entry 2), etc. As additional examples, when the value of HPB entry type information HPBETI is "11," it is an indication of the first type HPB entry (e.g., HPB entry 1) and the second type HPB entry (e.g., HPB entry 2), however the example embodiments are not limited thereto.

That is, when the UFS device controller 210 tries to recommend and/or instruct (e.g., cause) a change of the first type HPB entry (HPB entry 1) stored in the host memory 140, the UFS device controller 210 sets the value of HPB entry type information HPBETI in the response command RSP to 01, and when the UFS device controller 210 tries to recommend and/or instruct (e.g., cause) a change of the second type HPB entry (HPB entry 2) stored in the host memory 140, the UFS device controller 210 may set the value of the HPB entry type information HPBETI in the response command RSP to 10. Also, when the UFS device controller 210 tries to recommend and/or instruct (e.g., cause) the change of the first type HPB entry (HPB entry 1) and the second type HPB entry (HPB entry 2) stored in the host memory 140, the UFS device controller 210 may set the value of HPB entry type information HPBETI in the response command RSP to 11. However, the example embodiments are not limited thereto, and other HPB entry type information HPBETI values may be used, etc.

Although FIG. 9 shows an example of HPB entry type information HPBETI made up of 2-bits, an example of the HPB entry type information HPBETI is not limited to the shown example. If desired, the HPB entry type information HPBETI may be made up of more bits or less bits, and the reference of each of the shown bit values may be modified in various ways.

Next, the memory device 200 provides the generated response command RSP to the host device 100 (S140). Subsequently, the UFS host controller 110 of the host device 100 decodes the response command RSP (S150). For example, the UFS host controller 110 provides the memory device 200 with a request command for requesting an HPB entry to be stored in the HPB entry storage region (RG of FIG. 3) that is activated according to the decoding results (S160), but is not limited thereto.

In some example embodiments, such a request command may be implemented in the form of the HPB READ BUFFER command shown in FIG. 10 conforming to JEDEC HPB standard, but is not limited thereto. Since the detailed configuration of the HPB READ BUFFER command conforming to the JEDEC HPB standard is explained in the JEDEC HPB standard documents, the detailed explanation thereof will not be provided.

In some example embodiments, the request command HPB READ BUFFER generated by the UFS host controller 110 includes HPB entry type information HPBETI as shown in FIG. 10, but is not limited thereto.

If the change of the first type HPB entry (HPB entry 1) stored in the host memory 140 is recommended and/or instructed (e.g., caused, etc.) from the UFS device controller 210, the UFS host controller 110 may set the value of the HPB entry type information HPBETI in the request command HPB READ BUFFER to "01," and request the changed first type HPB entry (HPB entry 1) for the UFS device controller 210, etc.

Further, when the change of the second type HPB entry (HPB entry 2) stored in the host memory 140 is recommended and/or instructed (e.g., caused) from the UFS device controller 210, the UFS host controller 110 may set the value of HPB entry type information HPBETI in the request command HPB READ BUFFER to "10," and request the changed second type HPB entry (HPB entry 2) for the UFS device controller 210, etc.

Further, when the change of the first type HPB entry (HPB entry 1) and the second type HPB entry (HPB entry 2) stored in the host memory 140 is recommended and/or instructed (e.g., caused) from the UFS device controller 210, the UFS host controller 110 may set the value of the HPB entry type information HPBETI in the request command HPB READ BUFFER to "11," and request the changed first type HPB entry (HPB entry 1) and second type HPB entry (HPB entry 2) for the UFS device controller 210, etc.

Next, the UFS device controller 210 of the memory device 200 decodes the provided request command HPB READ BUFFER (S170). The UFS device controller 210 provides the host device 100 with an HPB entry to be stored in the HPB entry storage region (RG of FIG. 3) that is activated according to the decoding result (S180), but the example embodiments are not limited thereto.

Specifically, when the value of HPB entry type information HPBETI in the received request command HPB READ BUFFER is "01," the UFS device controller 210 may provide the host device with the first type HPB entry (HPB entry 1) generated through the process explained above referring to FIG. 7, but the example embodiments are not limited thereto.

When the value of the entry type information HPBETI of HPB in the received request command HPB READ BUF- FER is "10," the UFS device controller 210 may provide the host device with the second type HPB entry (HPB entry 2) generated through the process explained above referring to FIG. 7, but the example embodiments are not limited thereto.

Further, when the value of the HPB entry type information HPBETI in the received request command HPB READ BUFFER is "11," the UFS device controller 210 may provide the host device with the first type HPB entry (HPB entry 1) and the second type HPB entry (HPB entry 2) generated through the process explained above referring to FIG. 7, but the example embodiments are not limited thereto.

Next, the UFS host controller 110 updates the host memory 140 using the HPB entry provided from the memory device 200 (S190). The first type HPB entry (HPB entry 1) and the second type HPB entry (HPB entry 2) of the memory device 200 may be provided to the host device 100 through such a process, but is not limited thereto.

Hereinafter, another operation of providing the host device 100 with the first type HPB entry (HPB entry 1) and the second type HPB entry (HPB entry 2) of the memory device 200 will be described referring to FIGS. 1 and 11.

Figure 11:
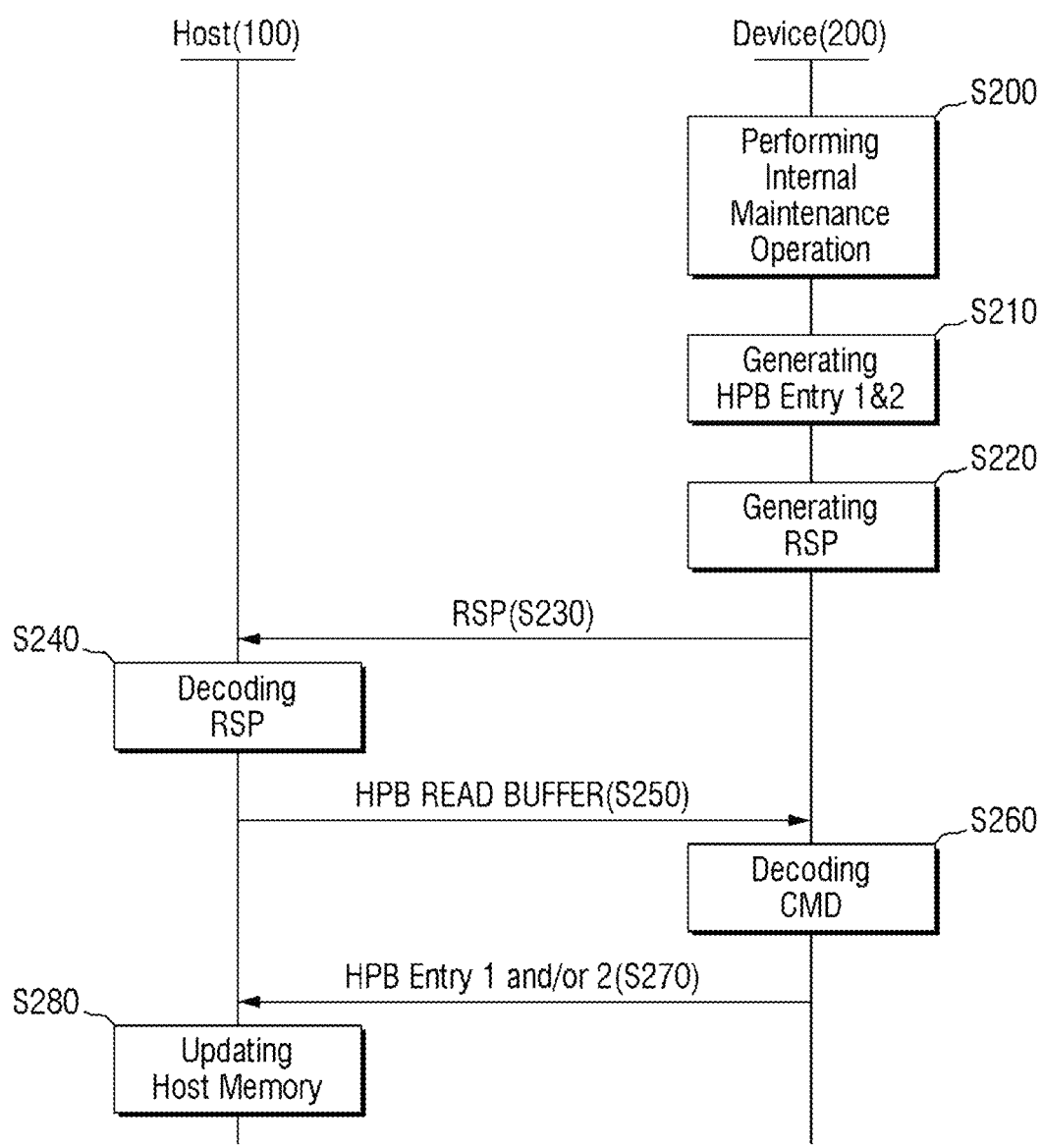
FIG. 11 is a flowchart showing the operation of the memory system according to some example embodiments.

FIG. 11 is a flowchart showing the operation of the memory system according to some example embodiments.

The operation shown in FIG. 11 may be, but is not limited to, performed in a state in which the UFS system 1 set to, for example, a device control mode.

Referring to FIGS. 1 and 11, the memory device 200 performs an internal maintenance operation (S200). Here, the internal maintenance operation may include operations for maintaining the performance of the memory device 200, but the example embodiments are not limited thereto.

In some example embodiments, such an internal maintenance operation may include, for example, garbage collection, wear-leveling, etc.

The physical address of the non-volatile storage 220 corresponding to the logical address for addressing the user data may be changed according to the internal maintenance operation. When such a change occurs, the memory device 200 generates the first type HPB entry (HPB entry 1) and the second type HPB entry (HPB entry 2), etc. (S220).

An operation (S210) of generating the first type HPB entry (HPB entry 1) and the second type HPB entry (HPB entry 2), subsequent operations (S220, S230) of generating and transmitting the response command by the memory device 200, operations (S240, S250) in which the UFS host controller 110 of the host device 100 decodes the response command RSP and provides the memory device 200 with the request command for requesting the HPB entry to be stored in the HPB entry storage region (RG of FIG. 3) that is activated according to and/or based on the decoding result, operations (S260, S270) in which the UFS device controller 210 of the memory device 200 decodes the received request command HPB READ BUFFER and the UFS device controller 210 provides the host device 100 with the HPB entry to be stored in the HPB entry storage region (RG of FIG. 3) that is activated according to the decoding result, and an operation (S280) in which the UFS host controller 110 updates the host memory 140 using the HPB entry provided from the memory device 200 are the same and/or similar to those discussed in the aforementioned example embodiments. Accordingly, repeated explanation will not be provided.

Hereinafter, other operations in which the first type HPB entry (HPB entry 1) and the second type HPB entry (HPB entry 2) of the memory device 200 are provided to the host device 100 will be described referring to FIGS. 1 and 12 to 14.

Figures 12, 13:
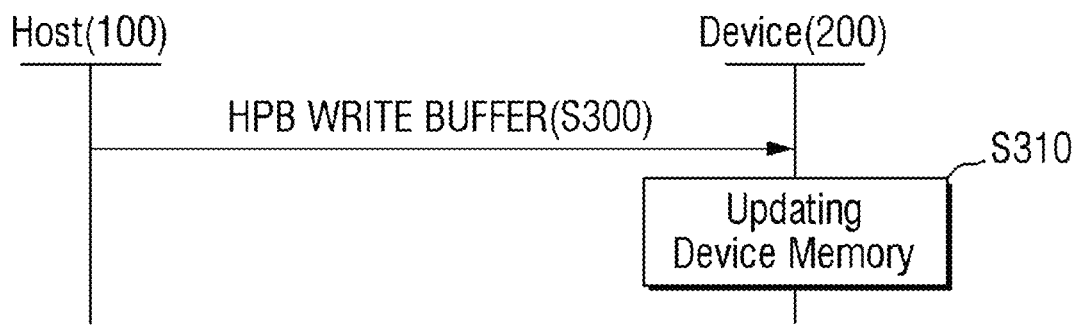
FIG. 12 is a flowchart showing the operation of the memory system according to some example embodiments.
FIGS. 13 and 14 are diagrams for explaining the operation of the memory system shown in FIG. 12 according to some example embodiments.
Figure 14:
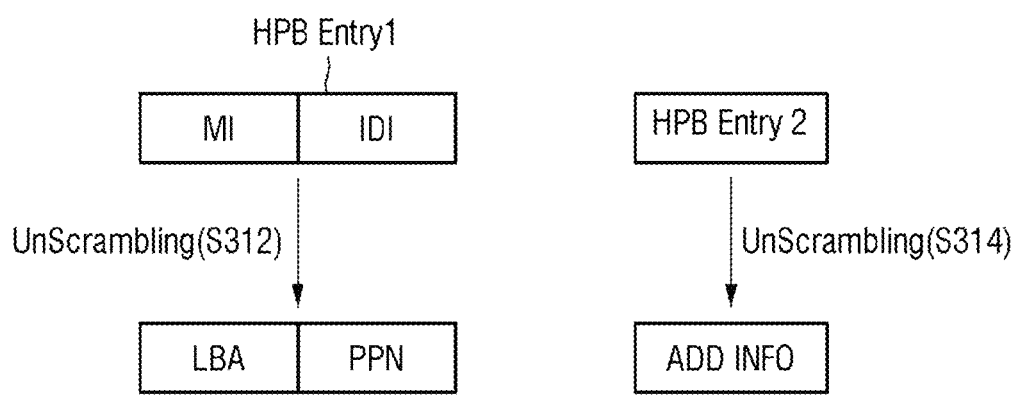

FIG. 12 is a flowchart showing the operation of the memory system according to some example embodiments. FIGS. 13 and 14 are diagrams for explaining the operation of the memory system shown in FIG. 12 according to some example embodiments.

The operation shown in FIG. 12 may be, but is not limited to, performed in a state in which the UFS system 1 is set to, for example, a host control mode, but is not limited thereto.

Referring to FIG. 12, the UFS host controller 110 provides the memory device 200 with a request command for requesting activation or deactivation of the multiple HPB entry storage regions (S300).

In some example embodiments, such a request command may be implemented in the form of the HPB WRITE BUFFER command shown in FIG. 13 conforming to JEDEC HPB standards, but the example embodiments are not limited thereto.

In some example embodiments, the request command HPB WRITE BUFFER generated by the UFS host controller 110 includes HPB entry type information HPBETI as shown in FIG. 13, and for example, a part of the reserved region (Reserved) may be used to transmit the first type HPB entry (HPB entry 1) and the second type HPB entry (HPB entry 2), but is not limited thereto.

That is, in some example embodiments, the request command HPB WRITE BUFFER generated by the UFS host controller 110 may include the HPB entry type information HPBETI, and the HPB entry including the first type HPB entry (HPB entry 1) and the second type HPB entry (HPB entry 2), etc.

Specifically, when trying to transmit the first type HPB entry (HPB entry 1) to the memory device 200, the UFS host controller 110 may set the value of the HPB entry type information HPBETI in the request command HPB WRITE BUFFER to "01," and may transmit the first type HPB entry (HPB entry 1) to the UFS device controller 210, etc.

Further, when trying to transmit the second type HPB entry (HPB entry 2) to the memory device 200, the UFS host controller 110 may set the value of the HPB entry type information HPBETI in the request command HPB WRITE BUFFER to "10" and may transmit the second type HPB entry (HPB entry 2) to the UFS device controller 210, etc.

Further, when trying to transmit the first type HPB entry (HPB entry 1) and the second type HPB entry (HPB entry 2) to the memory device 200, the UFS host controller 110 may set the value of HPB entry type information HPBETI in the request command HPB WRITE BUFFER to "11," and transmit the first type HPB entry (HPB entry 1) and the second type HPB entry (HPB entry 2) to the UFS device controller 210, etc.

Referring to FIG. 12 again, the UFS device controller 210 updates the device memory 240, using the HPB entry provided from the host device 100 (S310), but is not limited thereto.

Such an operation may be performed in reverse order of the generating operation (S120 of FIG. 6) of the first type HPB entry (HPB entry 1) and the second type HPB entry (HPB entry 2) described above, but the example embodiments are not limited thereto.

Specifically, referring to FIG. 14, the UFS device controller 210 unscrambles (and/or decrypts, translates, etc.) the first type HPB entry (HPB entry 1) including the mapping information MI and the indexing information IDI to extract the pair of physical address PPN and logical address LBA (S312), etc. The UFS device controller 210 may unscramble (and/or decrypt, translate, etc.) the second type HPB entry (HPB entry 2) to extract additional information ADD INFO that corresponds to the physical address PPN (S314), etc. The UFS device controller 210 may update the device memory 240 or the storage unit 221 of the device on the basis of the information extracted in this way, but is not limited thereto.

Hereinafter, a read operation using the first type HPB entry (HPB entry 1) and the second type HPB entry (HPB entry 2) will be described referring to FIGS. 1 and 15 to 19.

Figures 15, 16:
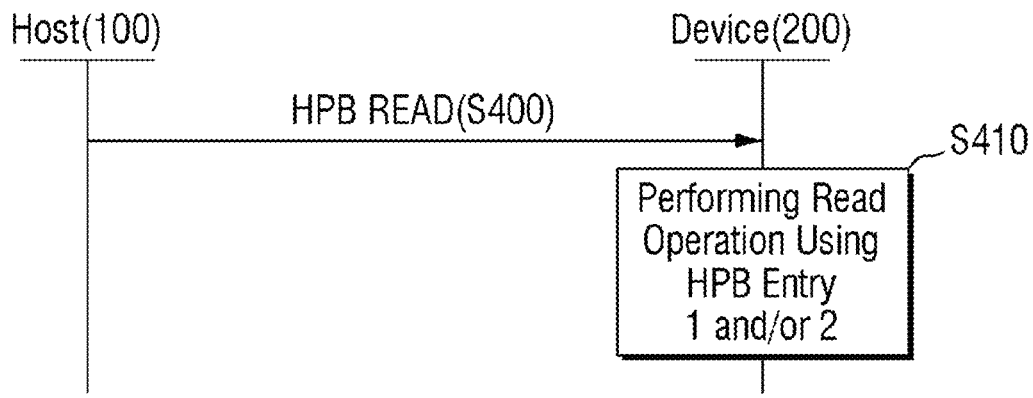
FIG. 15 is a flowchart showing the operation of the memory system according to some example embodiments.
FIGS. 16 to 19 are diagrams for explaining the operation of the memory system shown in FIG. 15 according to some example embodiments.

FIG. 15 is a flowchart showing the operation of the memory system according to some example embodiments. FIGS. 16 to 19 are diagrams for explaining the operation of the memory system shown in FIG. 15 according to some example embodiments.

Referring to FIGS. 1 and 15, the UFS host controller 110 provides the memory device 200 with a read command for reading the data stored in the plurality of storage units 221 (S400).

In some example embodiments, the read command may be implemented in the form of the HPB READ command shown in FIG. 16 conforming to JEDEC HPB standards, but the example embodiments are not limited thereto.

In some example embodiments, the read command HPB READ generated by the UFS host controller 110 may include the HPB entry type information HPBETI, the first type HPB entry (HPB entry 1) and the second type HPB entry (HPB entry 2) conforming to the HPB entry type information HPBETI, as shown in FIG. 16, but the example embodiments are not limited thereto.

Specifically, when the read operation of the memory device 200 includes and/or requires the first type HPB entry (HPB entry 1), the UFS host controller 110 may set the value of HPB entry type information HPBETI in the read command HPB READ to "01" and transmits the first type HPB entry (HPB entry 1) to the UFS device controller 210, etc.

Also, when the read operation of the memory device 200 includes and/or requires the second type HPB entry (HPB entry 2), the UFS host controller 110 may set the value of the HPB entry type information HPBETI in the read command HPB READ to "10" and transmits the second type HPB entry (HPB entry 2) to the UFS device controller 210, etc.

Also, when the read operation of the memory device 200 includes and/or requires the first type HPB entry (HPB entry 1) and the second type HPB entry (HPB entry 2), the UFS host controller 110 may set the value of HPB entry type information HPBETI in the read command HPB READ to "11," and transmits the first type HPB entry (HPB entry 1) and the second type HPB entry (HPB entry 2) to the UFS device controller 210, etc.

Referring to FIGS. 1 and 15, the UFS device controller 210 may perform the read operation using the HPB entry in response to the read command HPB READ (S410), but the example embodiments are not limited thereto.

Specifically, as shown in FIG. 14, the UFS device controller 210 extracts the pair of physical address PPN and logical address LBA, and additional information ADD INFO corresponding to the physical address PPN, from the HPB entry provided from the host device 100, and may read the data stored in the plurality of storage units 221 based on and/or using the extracted physical address PPN and additional information ADD INFO.

Such a read operation may be performed by the UFS device controller 210 on the non-volatile storage 220 using the storage interface 230, but is not limited thereto, and the read operation will be described in more detail below.

Figure 17:
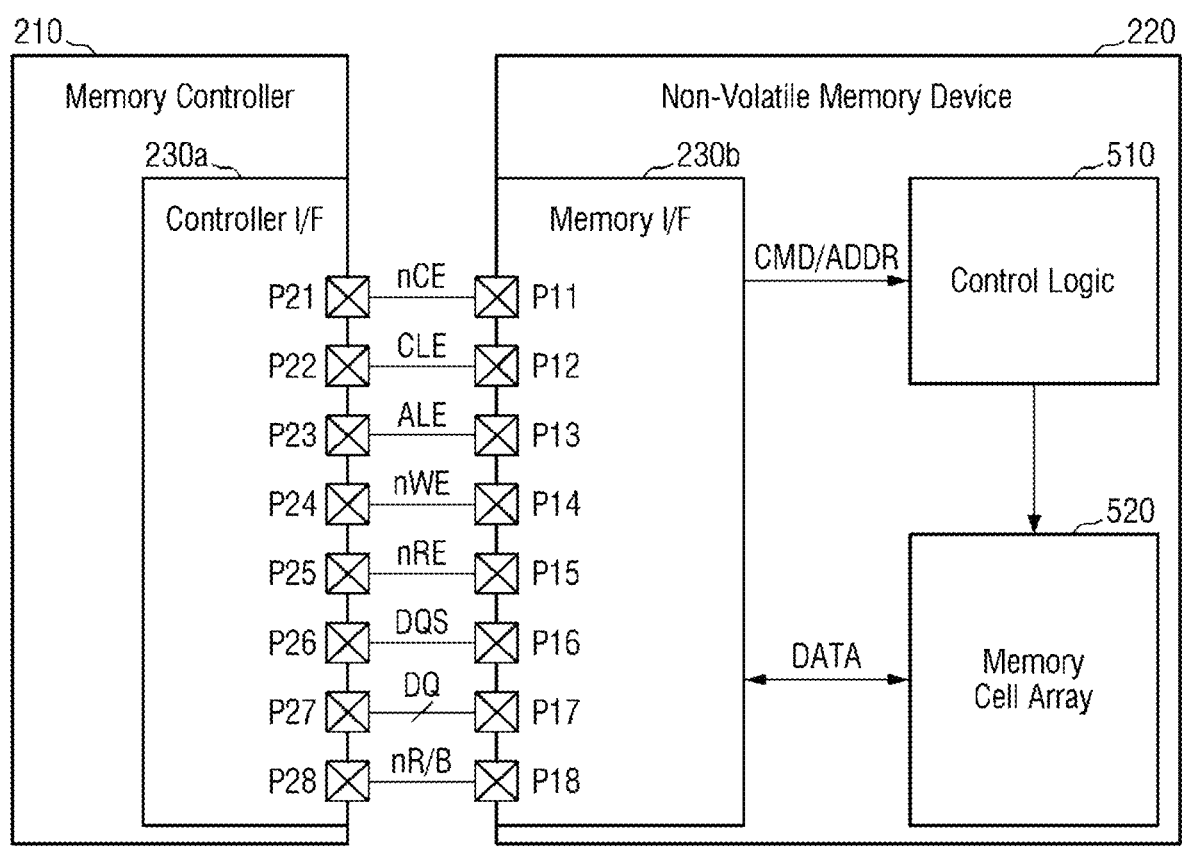

FIG. 17 is a diagram showing a reconfiguration of the UFS device controller 210, the storage interface 230, and the non-volatile storage 220 of FIG. 1 according to at least one example embodiment. The storage interface 230 of FIG. 1 may include a controller interface circuit 230a of FIG. 17 and/or a memory interface circuit 230b, etc., but is not limited thereto.

The memory device 220 may include a plurality of pins, such as first to eight pins P11 to P18, etc., a memory interface circuit 230b, a control logic circuit 510 (e.g., control logic processing circuitry, etc.), and/or a memory cell array 520, etc., but the example embodiments are not limited thereto.

The memory interface circuit 230b may receive a chip enable signal nCE from the memory controller 210 through the first pin P11, but is not limited thereto. The memory interface circuit 230b may transmit and/or receive signals to and/or from the memory controller 210 through second to eighth pins P12 to P18 according to the chip enable signal nCE, but is not limited thereto. For example, when the chip enable signal nCE is in an enabled state (e.g., a low level, etc.), the memory interface circuit 230b may transmit and/or receive signals to and/or from the memory controller 210 through the second to eighth pins P12 to P18, etc.

The memory interface circuit 230b may receive a command latch enable signal CLE, an address latch enable signal ALE, and/or a write enable signal nWE, etc., from the memory controller 210 through second to fourth pins P12 to P14, but is not limited thereto. The memory interface circuit 230b may receive a data signal DQ from the memory controller 210 and/or transmit the data signal DQ to the memory controller 210 through a seventh pin P17, but is not limited thereto. Command CMD, addresses ADDR, and/or data, etc., may be transferred through the data signal DQ, but is not limited thereto. For example, the data signal DQ may be transferred through the multiple data signal lines, etc. In some example embodiments, the seventh pin P17 may include multiple pins corresponding to the multiple data signals, but is not limited thereto.

The memory interface circuit 230b may acquire command CMD from the data signal DQ received in an enable interval (e.g., a high level state, etc.) of the command latch enable signal CLE on the basis of the toggle timings of the write enable signal nWE, but the example embodiments are not limited thereto. The memory interface circuit 230b may acquire the address ADDR from the data signal DQ received in the enable interval (e.g., the high level state, etc.) of the address latch enable signal ALE on the basis of the toggle timings of the write enable signal nWE, etc.

In some example embodiments, the write enable signal nWE maintains a static state (e.g., a constant high level or a constant low level), and then may toggle between the high level and the low level. For example, the write enable signal nWE may be toggled at the interval in which the command CMD and/or address ADDR is transmitted, but is not limited thereto. Accordingly, the memory interface circuit 230b may acquire the command CMD and/or address ADDR on the basis of the toggle timings of the write enable signal nWE, but the example embodiments are not limited thereto.

The memory interface circuit 230b may receive the read enable signal nRE from the memory controller 210 through the fifth pin P15, but is not limited thereto. The memory interface circuit 230b may receive a data strobe signal DQS from the memory controller 210 and/or transmit the data strobe signal DQS to the memory controller 210 through the sixth pin P16, but the example embodiments are not limited thereto.

In the data DATA output operation of the memory device 220, the memory interface circuit 230*b* may receive a read enable signal nRE toggled through the fifth pin P15 before outputting the data DATA, but the example embodiments are not limited thereto. The memory interface circuit 230*b* may generate the data strobe signal DQS toggled on the basis of the toggling of the read enable signal nRE, but is not limited thereto. For example, the memory interface circuit 230*b* may generate a data strobe signal DQS that starts toggling after a predetermined or alternatively, desired delay (e.g., tDQSRE) on the basis of the toggling start time of the read enable signal nRE, but is not limited thereto. The memory interface circuit 230*b* may transmit a data signal DQ including data DATA on the basis of the toggle timing of the data strobe signal DQS, but is not limited thereto. Accordingly, the data DATA may be arranged at the toggle timing of the data strobe signal DQS and transmitted to the memory controller 210, etc.

In the data DATA input operation of the memory device 220, when the data signal DQ including the data DATA is received from the memory controller 210, the memory interface circuit 230*b* may receive the data strobe signal DQS toggled together with the data DATA from the memory controller 210, but is not limited thereto. The memory interface circuit 230*b* may acquire data DATA from the data signal DQ on the basis of the toggle timing of the data strobe signal DQS, but is not limited thereto. For example, the memory interface circuit 230*b* may acquire data DATA by sampling the data signal DQ at the rising and falling edges of the data strobe signal DQS, or one of the rising and falling edge of the data strobe signal DQS, etc., but the example embodiments are not limited thereto.

The memory interface circuit 230*b* may transmit a ready/busy output signal nR/B to the memory controller 210 through an eighth pin P18, but is not limited thereto. The memory interface circuit 230*b* may transmit the state information of the memory device 220 to the memory controller 210 through the ready/busy output signal nR/B, etc. When the memory device 220 is in a busy state (that is, when the internal operations of the memory device 220 are being performed), the memory interface circuit 230*b* may transmit the ready/busy output signal nR/B indicating the busy state to the memory controller 210. When the memory device 220 is in a ready state (that is, when the internal operations of the memory device 220 are not performed or completed), the memory interface circuit 230*b* may transmit the ready/busy output signal nR/B indicating the ready state to the memory controller 210. For example, while the memory device 220 reads data DATA from the memory cell array 520 in response to the page read command, the memory interface circuit 230*b* may transmit the ready/busy output signal nR/B indicating the busy state (e.g., a low level, etc.) to the memory controller 210, but the example embodiments are not limited thereto. For example, while the memory device 220 programs data DATA into the memory cell array 520 in response to the program command, the memory interface circuit 230*b* may transmit the ready/busy output signal nR/B indicating the busy state to the memory controller 210, etc.

The control logic circuit 510 may be processing circuitry and may generally control various operations of the memory device 220. According to some example embodiments, the processing circuitry may include hardware, such as processors, processor cores, logic circuits, storage devices, etc.; a hardware/software combination such as at least one processor core executing software and/or executing any instruction set, etc.; or a combination thereof. For example, the processing circuitry more specifically may include, but is not limited to, a field programmable gate array (FPGA), a programmable logic unit, an application-specific integrated circuit (ASIC), s System-on-Chip (SoC), etc. The control logic circuit 510 may receive the command/address CMD/ADDR acquired from the memory interface circuit 230*b*. The control logic circuit 510 may generate the control signals for controlling other components of the memory device 220 according to the received command/address CMD/ADDR. For example, the control logic circuit 510 may generate various control signals for programming the data DATA into the memory cell array 520 and/or reading the data DATA from the memory cell array 520, but the example embodiments are not limited thereto.

The memory cell array 520 may store data DATA acquired from the memory interface circuit 230*b* under the control of the control logic circuit 510, but is not limited thereto. The memory cell array 520 may output the stored data DATA to the memory interface circuit 230*b* under the control of the control logic circuit 510, but is not limited thereto.

The memory cell array 520 may include a plurality of memory cells. For example, the plurality of memory cells is a flash memory cell. However, the example embodiments of the inventive concepts are not limited thereto, and the memory cells may be a RRAM (Resistive Random Access Memory cell), a FRAM (Ferroelectric Random Access Memory) cell, a PRAM (Phase Change Random Access Memory) cell, a TRAM (Thyristor Random Access Memory) cell, and/or an MRAM (Magnetic Random Access Memory) cell, etc. Hereinafter, example embodiments of the inventive concepts will be described with a focus on example embodiments in which the memory cells are NAND flash memory cells for the sake of convenience and brevity, but the example embodiments are not limited thereto.

The memory controller 210 may include a plurality of pins, such as first to eighth pins P21 to P28, etc., and/or a controller interface circuit 230*a*, etc., but is not limited thereto. The first to eighth pins P21 to P28 may correspond to the first to eighth pins P11 to P18 of the memory device 220, but are not limited thereto.

The controller interface circuit 230*a* may transmit a chip enable signal nCE to the memory device 220 through the first pin P21, but is not limited thereto. The controller interface circuit 230*a* may transmit and/or receive signals to and/or from the memory device 220, which is selected through the chip enable signal nCE, through second to eighth pins P22 to P28, etc.

The controller interface circuit 230*a* may transmit the command latch enable signal CLE, the address latch enable signal ALE, and/or the write enable signal nWE, etc., to the memory device 220 through the second to fourth pins P22 to P24, but is not limited thereto. The controller interface circuit 230*a* may transmit the data signal DQ to the memory device 220 and/or receive the data signal DQ from the memory device 220 through the seventh pin P27, but is not limited thereto.

The controller interface circuit 230*a* may transmit the data signal DQ, including the command CMD and/or the address ADDR, etc., along with the toggled read enable signal nWE, etc., to the memory device 220. The controller interface circuit 230*a* may transmit the data signal DQ including the command CMD to the memory device 220 by transmitting the command latch enable signal CLE having an enable state, and may transmit the data signal DQ including the address ADDR to the memory device 220 by transmitting the address latch enable signal ALE having an enable state, but the example embodiments are not limited thereto.

The controller interface circuit 230a may transmit the read enable signal nRE to the memory device 220 through the fifth pin P25, but is not limited thereto. The controller interface circuit 230a may receive the data strobe signal DQS from the memory device 220 through the sixth pin P26, and/or transmit the data strobe signal DQS to the memory device 220, but is not limited thereto.

According to at least one example embodiment, in the data DATA output operation of the memory device 220, the controller interface circuit 230a generates a toggling read enable signal nRE, and may transmit the read enable signal nRE to the memory device 220. For example, the controller interface circuit 230a may generate a read enable signal nRE changed from the static state (e.g., a constant high or a constant low level) to a toggled state (e.g., a change from a high level to a low level, or vice versa), before the data DATA is output. Accordingly, the data strobe signal DQS toggled on the basis of the read enable signal nRE may be generated in the memory device 220. The controller interface circuit 230a may receive the data signal DQ including data DATA along with the toggled data strobe signal DQS from the memory device 220, but is not limited thereto. The controller interface circuit 230a may acquire data DATA from the data signal DQ on the basis of the toggle timing of the data strobe signal DQS, but is not limited thereto.

According to at least one example embodiment, in the data DATA input operation of the memory device 220, the controller interface circuit 230a may generate the toggled data strobe signal DQS. For example, the controller interface circuit 230a may generate a data strobe signal DQS that is changed from the static state (e.g., a constant high level or a constant low level) to the toggled state, before transmitting the data DATA, but is not limited thereto. The controller interface circuit 230a may transmit the data signal DQ including data DATA to the memory device 220 on the basis of the toggle timing of the data strobe signal DQS, but is not limited thereto.

The controller interface circuit 230a may receive a ready/busy output signal nR/B from the memory device 220 through the eighth pin P28, but is not limited thereto. The controller interface circuit 230a may distinguish the state information of the memory device 220 on the basis of the ready/busy output signal nR/B.

Figure 18:
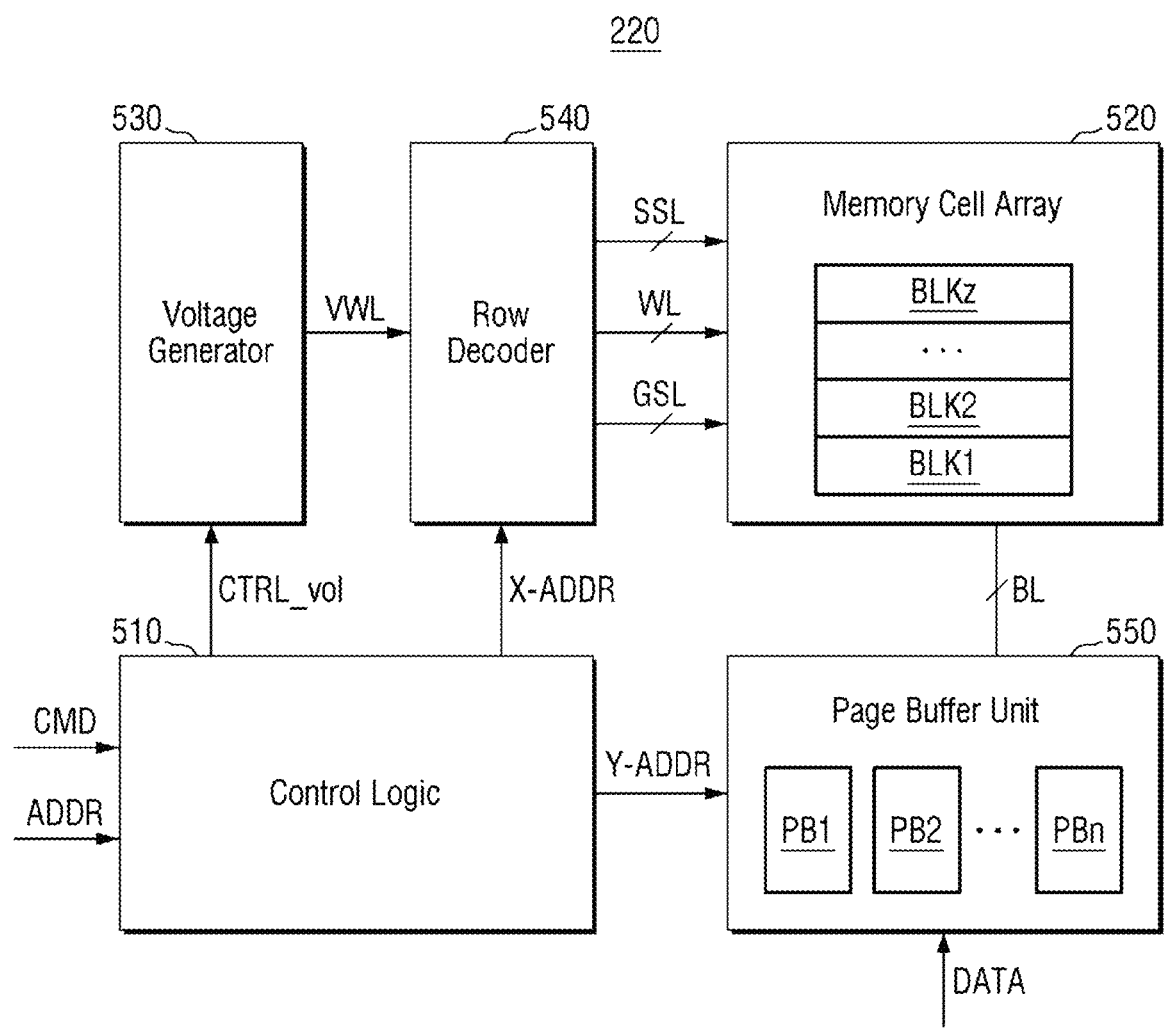

FIG. 18 is an example block diagram showing the memory device of FIG. 17 according to at least one example embodiment.

Referring to FIG. 17, the memory device 220 may include a control logic circuit 510 (e.g., control processing circuitry, etc.), a memory cell array 520, a page buffer unit 550 (e.g., a page buffer, page buffer circuitry, etc.), a voltage generator 530, and/or a row decoder 540, etc. Although it is not shown in FIG. 17, the memory device 220 may further include the memory interface circuit 230b shown in FIG. 17, and/or may further include a column logic, a free-decoder, a temperature sensor, a command decoder, an address decoder, and the like, but the example embodiments are not limited thereto.

The control logic circuit 510 may generally control various operations in the memory device 220. The control logic circuit 510 may output various control signals in response to the command CMD and/or the address ADDR from the memory interface circuit 230b, but is not limited thereto. For example, the control logic circuit 510 may output a voltage control signal CTRL_vol, a row address X-ADDR, and/or a column address Y-ADDR, etc.

The memory cell array 520 may include multiple memory blocks BLK1 to BLKz (z is a positive integer), and each of the multiple memory blocks BLK1 to BLKz may include multiple memory cells, etc. The memory cell array 520 may be connected to the page buffer unit 550 through the bit line BL, and may be connected to the row decoder 540 through the word lines WL, the string selection lines SSL, and/or the ground selection lines GSL, etc.

In some example embodiments, the memory cell array 520 may include a three-dimensional memory cell array, and the three-dimensional memory cell array may include multiple NAND strings, but the example embodiments are not limited thereto. Each NAND string may include memory cells connected to word lines vertically stacked on the substrate. U.S. Pat. Nos. 7,679,133, 8,553,466, 8,654,587, 8,559,235, and U.S. Patent Application Publication No. 2011/0233648 are each incorporated herein by reference in their entireties. In some example embodiments, the memory cell array 520 may include a two-dimensional memory cell array, and the two-dimensional memory cell array may include multiple NAND strings placed along the row and column directions.

The page buffer unit 550 may include multiple page buffers PB1 to PBn (where n is an integer of 3 or more), and the multiple page buffers PB1 to PBn may be connected to each of the memory cells through the multiple bit lines BL, but the example embodiments are not limited thereto. The page buffer unit 550 may select at least one bit line among the bit lines BL in response to and/or based on the column address Y-ADDR. The page buffer unit 550 may operate as an entry driver and/or a detection amplifier depending on the operation mode. For example, at the time of the program operation, the page buffer unit 550 may apply a bit line voltage corresponding to the data to be programmed to the selected bit line. At the time of the read operation, the page buffer unit 550 may detect the current and/or voltage of the selected bit line and detect the data stored in the memory cell.

The voltage generator 530 may generate various types of voltages for performing program, read, and/or erase operations, etc., (e.g., memory operations, etc.) on the basis of and/or according to the voltage control signal CTRL_vol. For example, the voltage generator 530 may generate a program voltage, a read voltage, a program verification voltage, an erasure voltage, and the like, as a word line voltage VWL.

The row decoder 540 may select one of the multiple word lines WL in response to and/or based on the row address X-ADDR, and select one of the multiple string selection lines SSL. For example, at the time of the program operation, the row decoder 540 may apply a program voltage and/or a program verification voltage to the selected word line, and may apply a read voltage to the selected word line at the time of the read operation, etc.

Figure 19:
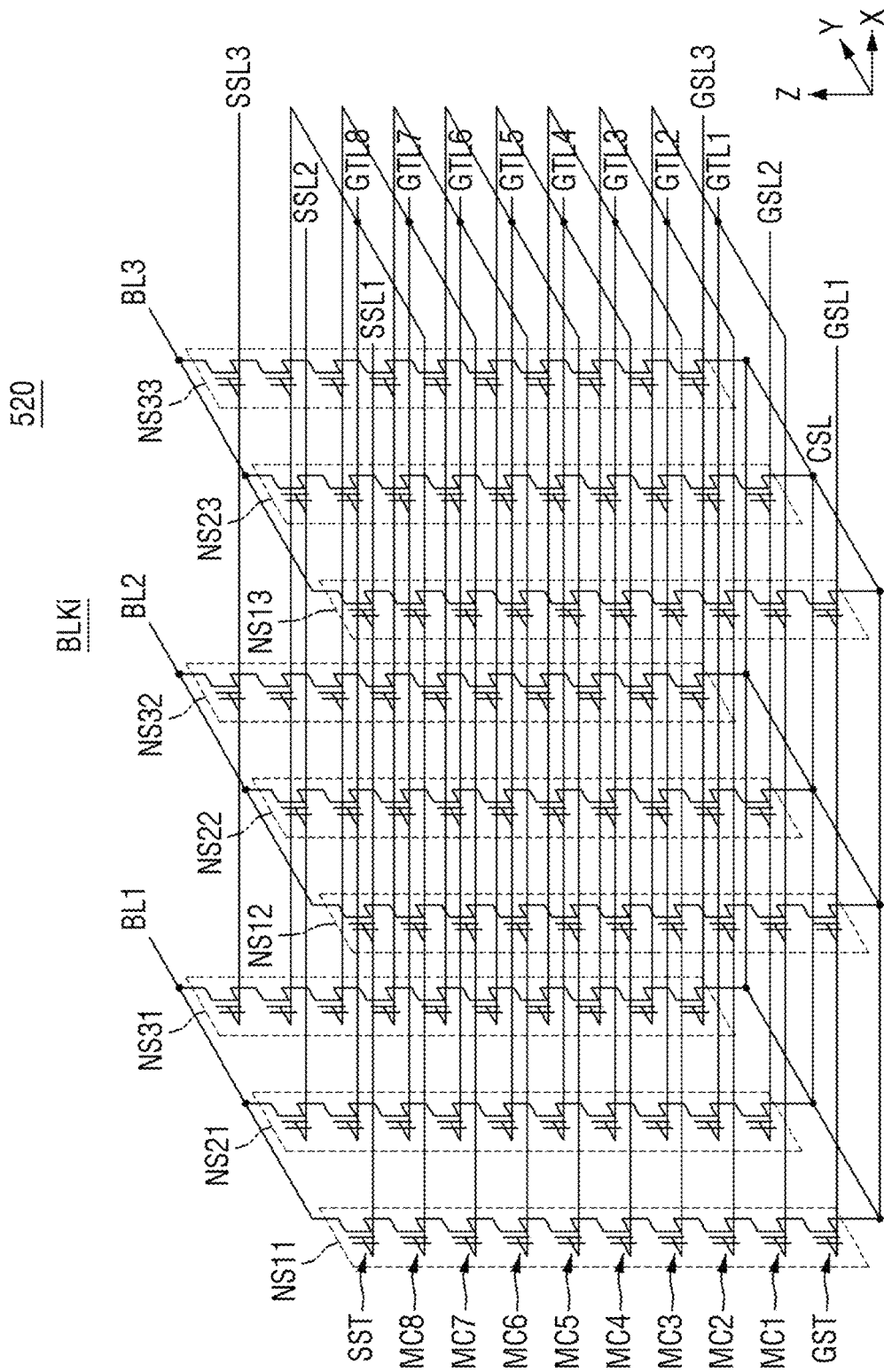

FIG. 19 is a diagram for explaining a 3D V-NAND structure that may be applied to the UFS device according to some example embodiments. When the storage module of the UFS device is implemented as a 3D V-NAND type flash memory, each of the plurality of memory blocks comprising the storage module may be represented by an equivalent circuit as shown in FIG. 19, but the example embodiments are not limited thereto.

A memory block BLKi shown in FIG. 19 shows a three-dimensional memory block formed in a three-dimensional structure on a substrate (e.g., a semiconductor substrate, etc.). For example, a plurality of memory NAND strings included in the memory block BLKi may be formed in a direction perpendicular to a surface of the substrate, but the example embodiments are not limited thereto.

Referring to FIG. 19, the memory block BLKi may include multiple memory NAND strings NS11 to NS33, etc., connected between a plurality of bit lines, such as the bit lines BL1, BL2 and BL3, etc., and the common source line CSL. The multiple memory NAND strings NS11 to NS33 may each include a string selection transistor SST, multiple memory cells MC1, MC2, . . . , and MC8, and/or a ground selection transistor GST, etc. Although FIG. 7 shows that the multiple memory NAND strings NS11 to NS33 each include eight memory cells MC1, MC2, . . . , and MC8, example embodiments are not necessarily limited thereto, and any number of memory cells may be included with one or more of the memory NAND strings.

The string selection transistor SST may be connected to a corresponding plurality of string selection lines, e.g., SSL1, SSL2 and SSL3, etc. The multiple memory cells MC1, MC2, . . . , and MC8 may be connected to respective corresponding plurality of gate lines GTL1, GTL2, . . . , and GTL8, but are not limited thereto. The plurality of gate lines GTL1, GTL2, . . . , and GTL8 may correspond to word lines, and some (e.g., a subset) of the gate lines GTL1, GTL2, . . . , and GTL8 may correspond to a dummy word line, but the example embodiments are not limited thereto. The ground selection transistor GST may be connected to a corresponding plurality of ground selection lines, e.g., GSL1, GSL2 and GSL3, etc. The string selection transistor SST may be connected to a plurality of corresponding bit lines, e.g., BL1, BL2 and BL3, etc., and the ground selection transistor GST may be connected to the common source line CSL, but the example embodiments are not limited thereto.

Word lines of the same height (e.g., WL1) are connected in common, and the plurality of ground selection lines GSL1, GSL2 and GSL3 and the plurality of string selection lines SSL1, SSL2 and SSL3 may be separated from each other, respectively. Although FIG. 9 shows that the memory block BLK is connected to eight gate lines GTL1, GTL2, . . . , and GTL8 and three bit lines BL1, BL2 and BL3, example embodiments are not necessarily limited thereto, and the memory block BLK may be connected to a greater or lesser number of gate lines and/or bit lines.

Figure 20:
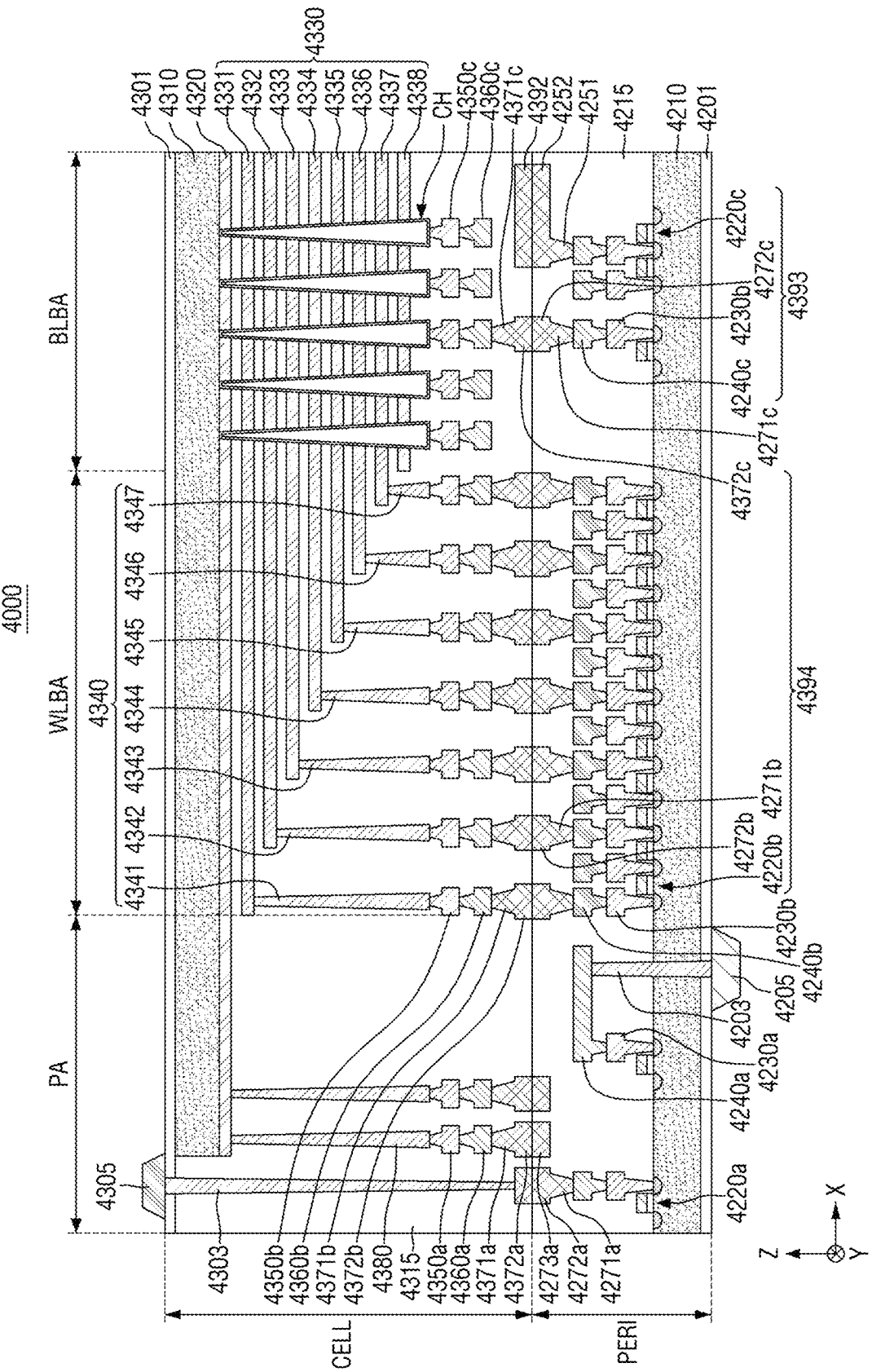
FIG. 20 is a diagram for explaining a BVNAND structure that may be applied to the memory system according to some example embodiments.

FIG. 20 is a diagram for explaining a bit vector NAND (BVNAND) structure that may be applied to the memory system according to some example embodiments.

Referring to FIG. 20, according to at least one example embodiment, a memory device 4000 may have a C2C (chip to chip) structure, but the example embodiments are not limited thereto. The C2C structure may mean a structure in which an upper chip including at least one cell region CELL is manufactured on a first wafer, at least one lower chip including a peripheral circuit region PERI is manufactured on a second wafer different from the first wafer, and after that, the at least one upper chip and the at least one lower chip are bonded to each other by a bonding way. As an example, the bonding way may mean a way of electrically connecting a bonding metal formed on an uppermost metal layer of the upper chip and a bonding metal formed on an uppermost metal layer of the lower chip, but is not limited thereto. For example, when the upper bonding metal is formed of copper (Cu), the bonding way may be a Cu-Cu bonding way, and the bonding metal may be formed of aluminum (Al) or tungsten (W), but the example embodiments are not limited thereto.

Each of the peripheral circuit region PERI and the cell region CELL of the memory device 400 may include an external pad bonding region PA, a word line bonding region WLBA, and/or a bit line bonding region BLBA, etc.

The peripheral circuit region PERI may include a first substrate 4210, an interlayer insulation layer 4215, a plurality of circuit elements 4220a, 4220b and 4220c formed on the first substrate 4210, a plurality of first metal layers 4230a, 4230b and 4230c connected to each of the plurality of circuit elements 4220a, 4220b and 4220c, and a plurality of second metal layers 4240a, 4240b and 4240c formed on the first metal layers 4230a, 4230b and 4230c, but the example embodiments are not limited thereto. In some example embodiments, the plurality of first metal layers 4230a, 4230b and 4230c may be formed of tungsten which has a relatively high resistance, and the second metal layers 4240a, 4240b and 4240c may be formed of copper which has a relatively low resistance, but the example embodiments are not limited thereto, and other metals may be used for the first metal layer and/or the second metal layers.

Although only the first metal layers 4230a, 4230b and 4230c and the second metal layers 4240a, 4240b and 4240c are shown and in FIG. 20, the example embodiments are not limited thereto, and, for example, one or more additional metal layers may be further formed on the second metal layers 4240a, 4240b and 4240c, etc. At least a part of one or more metal layers formed above the second metal layers 4240a, 4240b and 4240c may be formed of aluminum or the like which has an electrical resistance lower than copper which forms the second metal layers 4240a, 4240b and 4240c, but the example embodiments are not limited thereto.

An interlayer insulation layer 4215 is placed on the first substrate 4210 to cover a plurality of circuit elements, e.g., circuit elements 4220a, 4220b and 4220c, etc., the plurality of first metal layers, e.g., first metal layers 4230a, 4230b and 4230c, etc., and the plurality of second metal layers, e.g., second metal layers 4240a, 4240b and 4240c, etc., and may also include insulating materials such as silicon oxides and silicon nitrides, etc., but the example embodiments are not limited thereto.

Additionally, a plurality of lower bonding metals, e.g., lower bonding metals 4271b and 4272b, etc., may be formed on the second metal layer 4240b of the word line bonding region WLBA, but the example embodiments are not limited thereto. In the word line bonding region WLBA, the lower bonding metals 4271b and 4272b of the peripheral circuit region PERI may be electrically connected to a plurality of upper bonding metals, e.g., upper bonding metals 4371b and 4372b, etc., of the cell region CELL by the bonding way, but the example embodiments are not limited thereto. The lower bonding metals 4271b and 4272b and the upper bonding metals 4371b and 4372b may be formed of aluminum, copper, tungsten, or the like.

The cell region CELL may provide at least one memory block. The cell region CELL may include a second substrate 4310 and a common source line 4319, but is not limited thereto. A plurality of word lines (e.g., 4331 to 4338; 4330, etc.) may be stacked on the second substrate 4310 along a direction (e.g., a Z-axis direction) perpendicular to the upper face of the second substrate 4310, but the example embodiments are not limited thereto. String selection lines and a ground selection line may be placed above and below the word lines 4330, and a plurality of word lines 4330 may be placed between the string selection lines and the ground selection line, but the example embodiments are not limited thereto.

In the bit line bonding region BLBA, the channel structure CH extends in a direction perpendicular to the upper face of the second substrate 4310, and may penetrate the word lines 4330, the string selection lines, and/or the ground selection line, etc. The channel structure CH may include a data storage layer, a channel layer, and/or a buried insulation layer, and the like. The channel layer may be electrically connected to the first metal layer 4350c and/or the second metal layer 4360c, etc. For example, the first metal layer 4350c may be a bit line contact, and the second metal layer 4360c may be a bit line, but are not limited thereto. In some example embodiments, the bit line 4360c may extend along a second direction (e.g., Y-axis direction) parallel to the upper face of the second substrate 4310, etc.

In the at least one example embodiment shown in FIG. 20, the region in which the channel structure CH and the bit line 4360c are placed may be defined as the bit line bonding region BLBA, but the example embodiments are not limited thereto. The bit line 4360c may be electrically connected to the circuit elements 4220c that provide a page buffer 4393 in the peripheral circuit region PERI in the bit line bonding region BLBA, but is not limited thereto. As an example, the bit line 4360c is connected to the upper bonding metals 4371c and 4372c in the peripheral circuit region PERI, and the upper bonding metals 4371c and 4372c may be connected to the lower bonding metals 4271c and 4272c connected to the circuit elements 4220c of the page buffer 4393, but the example embodiments are not limited thereto.

In the word line bonding region WLBA, the word lines 4330 may extend along a second direction (e.g., the X-axis direction) perpendicular to the first direction (e.g., Y-axis direction) and parallel to the upper face of the second substrate 4310, and may be connected to multiple cell contact plugs (4341 to 4347; 4340), but the example embodiments are not limited thereto. The word lines 4330 and the cell contact plugs 4340 may be connected to each other with pads provided by extending at least a part of the word lines 4330 along the second direction with different lengths, but are not limited thereto. The first metal layer 4350b and the second metal layer 4360b may be connected and/or connected sequentially to the top of the cell contact plugs 4340 connected to the word lines 4330, but are not limited thereto. The cell contact plugs 4340 may be connected to the peripheral circuit region PERI through the plurality of upper bonding metals, e.g., upper bonding metals 4371b and 4372b, etc., of the cell region CELL and the plurality of lower bonding metals, e.g., lower bonding metals 4271b and 4272b, etc., of the peripheral circuit region PERI, in the word line bonding region WLBA, but the example embodiments are not limited thereto.

The cell contact plugs 4340 may be electrically connected to the circuit elements 4220b that form a row decoder 4394 in the peripheral circuit region PERI. In example embodiments, the operating voltage of the circuit elements 4220b that form the row decoder 4394 may be different from the operating voltage of the circuit elements 4220c that form the page buffer 4393, but the example embodiments are not limited thereto. As an example, the operating voltage of the circuit elements 4220c that form the page buffer 4393 may be higher than the operating voltage of the circuit elements 4220b that form the row decoder 4394, but is not limited thereto.

A common source line contact plug 4380 may be placed in the external pad bonding region PA. The common source line contact plug 4380 is formed of a conductive material such as metal, metal compound or polysilicon, etc., and may be electrically connected to the common source line 4320, but the example embodiments are not limited thereto. The first metal layer 4350a and the second metal layer 4360a may be stacked sequentially on the upper part of the common source line contact plug 4380, but are not limited thereto. As an example, the region in which the common source line contact plug 4380, the first metal layer 4350a, and the second metal layer 4360a are placed may be defined as the external pad bonding region PA, etc.

On the other hand, input-output pads 4205 and 4305 may be placed in the external pad bonding region PA, but are not limited thereto. Referring to FIG. 20, according to at least one example embodiment, a lower insulating film 4201 that covers the first substrate 4210 may be formed below the first substrate 4210, and the first input-output pad 4205 may be formed on the lower insulating film 4201, but the example embodiments are not limited thereto. The first input-output pad 4205 is connected to at least one of a plurality of circuit elements 4220a, 4220b and 4220c, etc., placed in the peripheral circuit region PERI through the first input-output contact plug 4203, and may be separated from the first substrate 4210 by the lower insulating film 4201, but is not limited thereto. Further, a side insulating film is placed between the first input-output contact plug 4203 and the first substrate 4210, and may electrically separate the first input-output contact plug 4203 and the first substrate 4210, etc.

Referring to FIG. 20, an upper insulating film 4301 that covers the upper face of the second substrate 4310 may be formed above the second substrate 4310, and the second input-output pad 4305 may be placed on the upper insulating film 4301, but the example embodiments are not limited thereto. The second input-output pad 4305 may be connected to at least one of a plurality of circuit elements, e.g., circuit elements 4220a, 4220b and 4220c, etc., placed in the peripheral circuit region PERI through the second input-output contact plug 4303. In some example embodiments, the second input-output pad 4305 may be electrically connected to the circuit element 4220a, but is not limited thereto.

According to some example embodiments, the second substrate 4310 and the common source line 4320 may not be placed in the region in which the second input-output contact plug 4303 is placed, but is not limited thereto. Also, the second input-output pad 4305 may not overlap the word lines 4380 in the third direction (e.g., Z-axis direction). Referring to FIG. 20, according to at least one example embodiment, the second input-output contact plug 4303 is separated from the second substrate 4310 in a direction parallel to the upper face of the second substrate 4310, may penetrate the interlayer insulating layer 4315 of the cell region CELL, and be connected to the second input-output pad 4305, but the example embodiments are not limited thereto.

According to some example embodiments, the first input-output pad 4205 and the second input-output pad 4305 may be selectively formed. As an example, the memory device 4000 may include only the first input-output pad 4205 placed above the first substrate 4201 or may include only the second input-output pad 4305 placed above the second substrate 4301, but is not limited thereto. Or, the memory device 4000 may include both the first input-output pad 4205 and the second input-output pad 4305, etc.

A metal pattern of the uppermost metal layer exists as a dummy pattern in each of the external pad bonding region PA and the bit line bonding region BLBA included in each of the cell region CELL and the peripheral circuit region PERI, or the uppermost metal layer may be emptied, but the example embodiments are not limited thereto.

According to at least one example embodiment, the memory device 4000 may form a lower metal pattern 4273a having the same shape as the upper metal pattern 4372a of the cell region CELL on the uppermost metal layer of the peripheral circuit region PERI to correspond to the upper metal pattern 4372a formed in the uppermost metal layer of the cell region CELL, in the external pad bonding region PA, but the example embodiments are not limited thereto. The lower metal pattern 4273a formed on the uppermost metal layer of the peripheral circuit region PERI may not be connected to another contact in the peripheral circuit region PERI, but is not limited thereto. Similarly, an upper metal pattern 4372a having the same shape as the lower metal pattern 4273a of the peripheral circuit region PERI may be formed on the upper metal layer of the cell region CELL to correspond to the lower metal pattern 4273a formed in the uppermost metal layer of the peripheral circuit region PERI, in the external pad bonding region PA, but the example embodiments are not limited thereto.

A plurality of lower bonding metals, e.g., 4271b and 4272b, etc., may be formed on the second metal layer 4240b of the word line bonding region WLBA. In the word line bonding region WLBA, the lower bonding metals 4271b and 4272b of the peripheral circuit region PERI may be electrically connected to the upper bonding metals 4371b and 4372b of the cell region CELL by the bonding way, but the example embodiments are not limited thereto.

Further, in the bit line bonding region BLBA, an upper metal pattern 4392 having the same shape as the lower metal pattern 4252 of the peripheral circuit region PERI may be formed on the uppermost metal layer of the cell region CELL to correspond to the lower metal pattern 4252 formed on the uppermost metal layer of the peripheral circuit region PERI, but the example embodiments are not limited thereto. No contact may be formed on the upper metal pattern 392 formed on the uppermost metal layer of the cell region CELL, but the example embodiments are not limited thereto.

In concluding the detailed description, a person of ordinary skill in the art will appreciate that many variations and modifications may be made to one or more of the example embodiments without substantially departing from the principles of the inventive concepts. Therefore, the disclosed example embodiments of the inventive concepts are used in a generic and descriptive sense only, and not for purposes of limitation.

What is claimed is:

1. A memory device comprising:
   a plurality of storage units configured to store data; and
   at least one device controller configured to,
   provide at least one host device with a response command,
   receive a read command from the at least one host device,
   the read command including at least one of mapping information and indexing information associated with the read command retrieved from a first HPB (high performance boosting) entry storage region of a plurality of HPB entry storage regions included in the at least one host device, and additional information related to the read command from a second HPB entry storage region included in the plurality of HPB entry storage regions included in the at least one host device, the mapping information indicating a mapping between a logical address associated with a memory operation and a physical address associated with the memory operation, and the indexing information indicating a location of the second HPB entry storage region associated with the memory operation, and the additional information related to operation of the device controller, and
   read data stored in the plurality of storage units based on at least one of the mapping information, and the indexing information, and the additional information in response to the read command,
   wherein the response command indicates an activation or deactivation of the plurality of HPB entry storage regions, and the response command includes HPB entry type information which indicates a HPB entry type of the plurality of HPB entry storage regions.

2. The memory device of claim 1, wherein
   the first HPB entry storage region corresponds to a first HPB entry type
   the second HPB entry storage region corresponds to a second HPB entry type;
   a first value of the HPB entry type information indicates the first HPB entry type;
   a second value of the HPB entry type information indicates the second HPB entry type; and
   a third value of the HPB entry type information indicates both the first HPB entry type and the second HPB entry type.

3. The memory device of claim 2, wherein the HPB entry type information includes at least 2 bits of information.

4. The memory device of claim 1, wherein the additional information includes information on a voltage level of a read voltage which is used during a read operation of the data stored in the plurality of storage units.

5. The memory device of claim 1, wherein
   the device controller is further configured to receive a request command indicating a request of a HPB entry to be stored in a HPB entry storage region to be activated on the host device; and
   the request command includes HPB entry type information indicating a HPB entry type to be stored in the HPB entry storage region to be activated.

6. The memory device of claim 5, wherein
   the plurality of HPB entry storage regions includes at least a first HPB entry type storage region and a second HPB entry type storage region, and
   the device controller is further configured to provide the host device with at least one of a first type HPB entry and a second type HPB entry based on the HPB entry type information, in response to the request command.

7. The memory device of claim 1, wherein
   the plurality of HPB entry storage region includes a first HPB entry type storage region and a second HPB entry type storage region; and
   the device controller is further configured to,
   receive a command from the host device related to the memory operation, and in response to execution of the memory operation related to the command,
   generate the mapping information between the logical address associated with the memory operation and the physical address associated with the memory operation,
   generate a first type HPB entry to be stored in the first HPB entry storage region, the first type HPB entry including the indexing information indicating the location of the second HPB entry storage region associated with the memory operation, and
   generate a second type HPB entry to be stored in the second HPB entry storage region, the second type HPB entry including the additional information associated with a read operation of the plurality of storage units.

8. The memory device of claim 1, wherein
the plurality of HPB entry storage regions includes at least a first HPB entry storage region and a second type HPB entry storage region; and
the device controller is further configured to,
perform an internal maintenance operation, and
generate mapping information between a logical address associated with the internal maintenance operation and a physical address associated with the internal maintenance operation,
generate a first type HPB entry to be stored in the first HPB entry storage region, the first type HPB entry including indexing information indicating a location of the second HPB entry type storage region associated with the internal maintenance operation, and
generate a second type HPB entry to be stored in the second HPB entry storage region, the second type HPB entry including additional information associated with the internal maintenance operation of the plurality of storage units, in response to the execution of the internal maintenance operation.

9. The memory device of claim 8, wherein the internal maintenance operation includes garbage collection.

10. A host device comprising:
at least one host memory including a plurality of HPB (high performance boosting) entry storage regions; and
at least one host controller configured to transmit a HPB entry and a read command to at least one memory device, the HPB entry to be stored in one of the plurality of HPB entry storage regions, wherein
the plurality of HPB entry storage regions includes at least a first HPB entry type storage region corresponding to a first HPB entry type and a second HPB entry type storage region corresponding to a second HPB entry type,
the first HPB entry type storage region is configured to store mapping information between a logical address associated with the read command and a physical address associated with the read command, and indexing information indicating a location of the second HPB type entry storage region associated with the read command,
the second HPB type entry storage region is configured to store additional information associated with a read operation performed by the memory device in response to the read command, and
the read command including HPB entry type information indicating a HPB entry type of the transmitted HPB entry, and the read command further including at least one of the mapping information associated with the read command and the indexing information associated with the read command from the first HPB type entry storage region, and the additional information associated with the read command from the second HPB type entry storage region.

11. The host device of claim 10, wherein the host controller is further configured to:
determine a position of a second type HPB entry stored in the plurality of HPB entry storage regions based on the indexing information stored in the first HPB entry type storage region associated with the read operation.

12. The host device of claim 10, wherein
a first value of the HPB entry type information indicates the first HPB entry type;
a second value of the HPB entry type information indicates the second HPB entry type; and
a third value of the HPB entry type information indicates both the first HPB entry type and the second HPB entry type.

13. The host device of claim 12, wherein the HPB entry type information includes at least 2 bits of information.

14. The host device of claim 10, wherein
the memory device includes a device memory including the plurality of HPB entry storage regions;
the host controller is configured to provide a request command indicating a request of activation or deactivation of the plurality of HPB entry storage regions; and
the request command includes HPB entry type information which indicates the type of HPB entry stored in the plurality of HPB entry storage regions.

15. A memory system comprising:
at least one host memory including a plurality of HPB (high performance boosting) entry storage regions, the plurality of HPB entry storage regions including at least a first HPB entry storage region and a second HPB entry storage region, the at least one host memory configured to store at least one HPB entry in at least one HPB entry storage region of the plurality of HPB entry storage regions;
at least one host controller configured to output a read command including the at least one HPB entry;
a plurality of storage units configured to store user data; and
at least one device controller configured to receive the read command from the at least one host controller, the read command including HPB entry type information, the HPB entry type information indicating a type of the HPB entry, wherein
the plurality of HPB entry storage regions includes at least a first HPB entry type storage region corresponding to a first HPB entry type and a second HPB entry type storage region corresponding to a second HPB entry type,
the first HPB entry type storage region is configured to store mapping information between a logical address associated with the read command and a physical address associated with the read command, and indexing information indicating a location of the second HPB type entry storage region associated with the read command,
the second HPB type entry storage region is configured to store additional information associated with a read operation performed in response to the read command,
the read command further including at least one of the mapping information and the indexing information associated with the read command from the first HPB entry type storage region, and the additional information associated with the read command from the second HPB entry type storage region, and
the at least one device controller further configured to read data stored in the plurality of storage units based on at least one of the mapping information, indexing information, and the additional information in response to the read command.

16. The memory system of claim 15, wherein
the at least one HPB entry includes a first type HPB entry and a second type HPB entry;
the first HPB entry storage region is configured to store the first type HPB entry;
the second HPB entry storage region is configured to store the second type HPB entry; and the host controller is further configured to determine a position of the second type HPB entry based on information included in the first type HPB entry.

17. The memory system of claim 15, wherein the device controller is further configured to provide the host controller with a response command indicating activation or deactivation of the plurality of HPB entry storage regions, the response command including the HPB entry type information.

18. The memory system of claim 15, wherein the host controller is further configured to provide the device controller with a request command which requests storage of the at least one HPB entry in a HPB entry storage region to be activated, and the request command includes the HPB entry type information.

* * * * *